(12) United States Patent
Lanoiselee et al.

(10) Patent No.: US 9,614,712 B2
(45) Date of Patent: Apr. 4, 2017

(54) METHOD FOR REDUCING PAPR IN A TRANSMISSION OF A MULTI-CARRIER SIGNAL, AND CORRESPONDING TRANSMISSION DEVICE AND COMPUTER PROGRAM

(71) Applicant: Orange, Paris (FR)

(72) Inventors: Marc Lanoiselee, La Chapelle des Fougeretz (FR); Pierre Siohan, Rennes (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/773,676

(22) PCT Filed: Mar. 7, 2014

(86) PCT No.: PCT/FR2014/050519
§ 371 (c)(1),
(2) Date: Sep. 8, 2015

(87) PCT Pub. No.: WO2014/135811
PCT Pub. Date: Sep. 12, 2014

(65) Prior Publication Data
US 2016/0050099 A1    Feb. 18, 2016

(30) Foreign Application Priority Data
Mar. 8, 2013  (FR) ..................... 13 52106

(51) Int. Cl.
*H04L 27/34* (2006.01)
*H04L 27/26* (2006.01)

(52) U.S. Cl.
CPC ...... *H04L 27/3411* (2013.01); *H04L 27/2614* (2013.01); *H04L 27/2621* (2013.01)

(58) Field of Classification Search
CPC ............. H04L 27/2621; H04L 27/2614; H04L 27/3411
See application file for complete search history.

(56) References Cited

U.S. PATENT DOCUMENTS

| 2007/0140367 A1 | 6/2007 | Braithwaite |
| 2010/0226449 A1* | 9/2010 | Ilow ................... H04L 27/2615 375/260 |

(Continued)

OTHER PUBLICATIONS

International Search Report and Written Opinion dated Jun. 23, 2014 for International Application No. PCT/FR2014/050519, filed Mar. 7, 2014.

(Continued)

*Primary Examiner* — Michelle M Koeth
(74) *Attorney, Agent, or Firm* — David D. Brush; Westman, Champlin & Koehler, P.A.

(57) ABSTRACT

A method for multi-carrier transmission of a signal including OFDM blocks formed from N carriers modulated by a constellation symbol. The method includes, for at least one OFDM block: a phase of prebuilding M prebuilt complex time samples representative of the N carriers of the OFDM block, and a phase of correcting the constellation symbols modulating the N carriers, including the following acts, repeated for each carrier: detection of P samples having a power higher than a predefined threshold, delivering the P samples and M−P zero samples, forming M complex time samples to be corrected, correcting the constellation symbol on the basis of the M complex time samples to be corrected, delivering an item of complex correction data, building M complex time samples associated with the item of complex correction data, and updating the M prebuilt complex time samples.

15 Claims, 4 Drawing Sheets

(56) References Cited

U.S. PATENT DOCUMENTS

2010/0272221 A1* 10/2010 Walker ................ H04B 1/0475
                                                              375/346
2015/0271001 A1    9/2015 Lanoiselee et al.

OTHER PUBLICATIONS

DVB Organization: "TM-NGH1210_96_PAPR_Reduction. docx", DVB, Digital Video Broadcasting, c/o EBU—17A Ancienne Route—CH-1218 Grand Saconnex, Geneva—Switzerland, Nov. 25, 2011 (Nov. 25, 2011), XP017838345, p. 1.

Jiang et al., "An Overview of Peak-to-Average Power Ratio, Reduction Techniques for OFDM Signals" IEEE Trans. on Broadcasting, vol. N°2 Jun. 2008.

English translation of the International Written Opinion dated Sep. 8, 2015 for International Application No. PCT/FR2014/050519, filed Mar. 7, 2014.

* cited by examiner

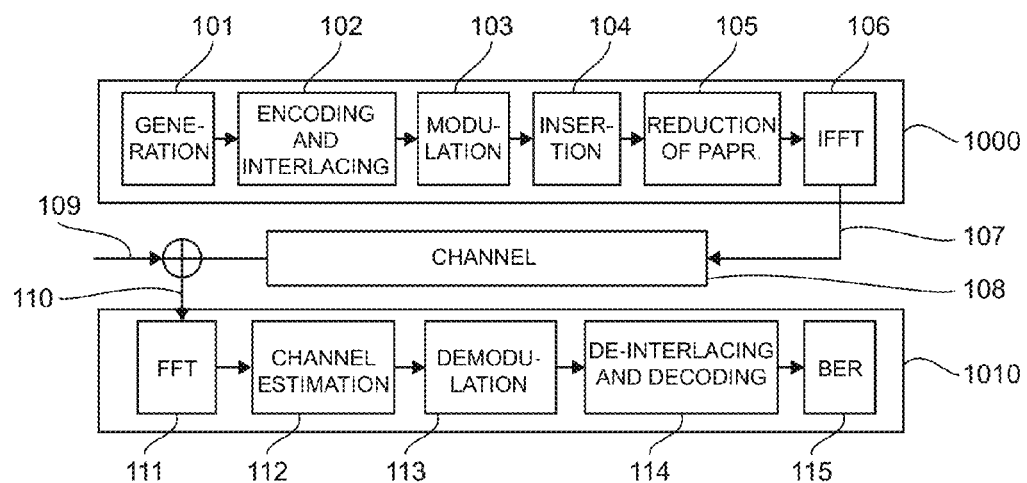
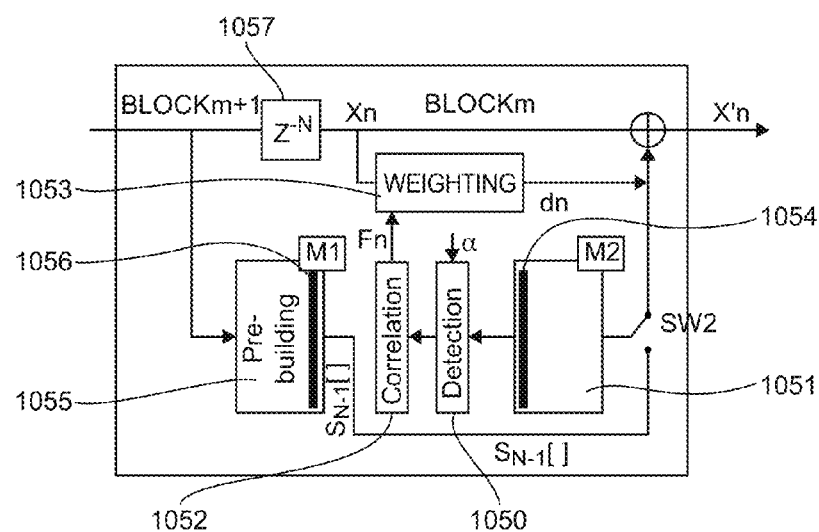
Fig. 1A
Fig. 1B

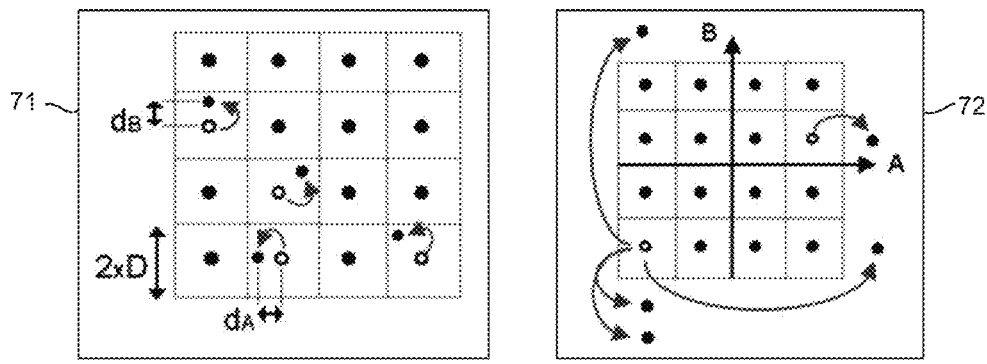
Fig. 7
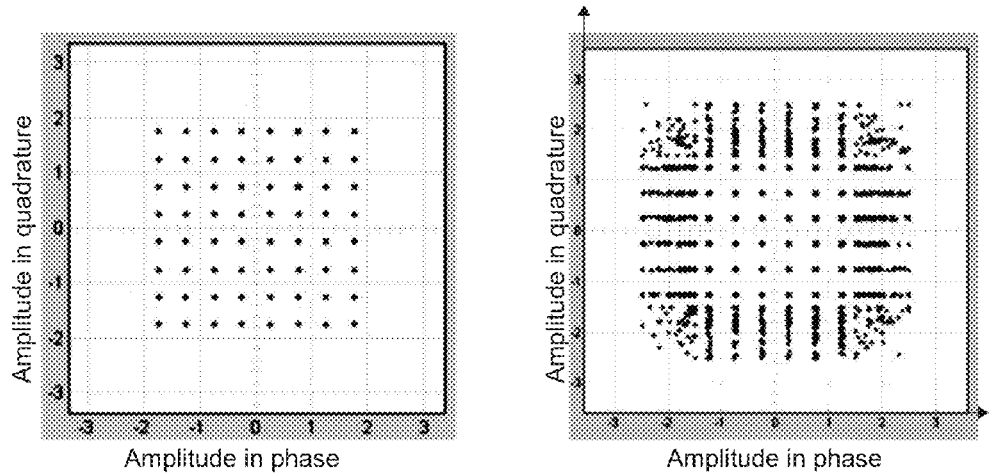
Fig. 8A  Fig. 8B
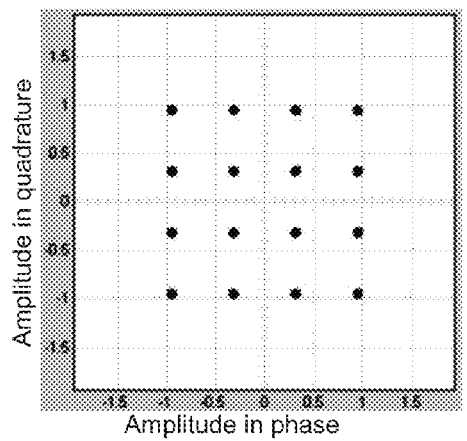 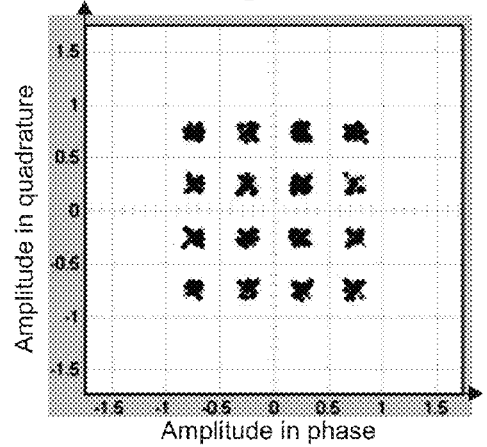
Fig. 8C  Fig. 8D

METHOD FOR REDUCING PAPR IN A TRANSMISSION OF A MULTI-CARRIER SIGNAL, AND CORRESPONDING TRANSMISSION DEVICE AND COMPUTER PROGRAM

CROSS-REFERENCE TO RELATED APPLICATIONS

This Application is a Section 371 National Stage Application of International Application No. PCT/FR2014/050519, filed Mar. 7, 2014, the content of which is incorporated herein by reference in its entirety, and published as WO 2014135811 A1 on Sep. 12, 2014, not in English.

FIELD OF THE DISCLOSURE

The field of the invention is that of radiofrequency communications for which a multi-carrier modulation, especially of the OFDM (Orthogonal Frequency Division Multiplex) type, is used.

More specifically, OFDM modulation is increasingly being used for digital transmission, especially on multiple-path transmission channels. This multi-carrier modulation technique can be used especially to get rid of inter-symbol interference generally observed during the use of a multi-carrier modulation on a multi-path channel. In addition, this technique has very high spectral efficiency and enables savings of radio spectral resources through the use of single-frequency networks.

Owing to its intrinsic robustness relative to multi-path channels and to frequency-selective channels, OFDM modulation is especially, but not exclusively, used in local wireless networks (Wi-Fi networks), 3GPP LTE ("3rd Generation Partnership Project" and "Long Term Evolution") cellular mobile telephony, or again ADSL (Asymmetric Digital Subscriber Line) technologies, but also for standards such as those relating to Digital Audio Broadcasting (DAB), digital television broadcasting especially DVB-T (Digital Video Broadcasting-Terrestrial) or again the new DVB-T2 standard.

BACKGROUND OF THE DISCLOSURE

Drawbacks of OFDM Modulation

One major drawback of the OFDM technique is inherent in the major fluctuations in amplitude of the envelope of the modulated signal and therefore in the major variations of instantaneous power.

Indeed, in the time domain, the summing of these independently modulated multiple carriers is done in terms of power most of the time but also consistently. This leads to instantaneous power peaks that can surpass the average power of the signal by more than 10 dB at certain instants.

The peak-to-average-power ratio or PAPR of the signals sent, in other words the factor characterizing the level of these power peaks relative to the average power of the signal is thus generally very high and increases with the number of carriers N.

Power amplifiers have non-linear characteristics which, coupled with the amplification of the signals, called high PAPR signals, lead to distortions: spectral regrowth of the level of the side lobes, generation of harmonics, creation of non-linear inter-symbol interference, creation of inter-carrier interference. Thus, these distortions especially give rise to errors in transmission and to a deterioration of the binary error rate (BER).

Definition of PAPR

More specifically, one particular embodiment uses a B-band OFDM signal constituted by the sum of the N regularly modulated orthogonal carriers spaced out at frequency intervals $\Delta f$ such that: $B=N.\Delta f$. For a given OFDM block, each carrier is modulated by a symbol $X_n$ belonging to a constellation (QPSK, QAM16, etc.). The inverse Fourier transform of the B-band frequency signal then gives the signal x(t) in the time domain and this signal will be transmitted. In the time domain, the duration of an OFDM block is $N.Te=1/\Delta f$, Te being the sampling period, and has the expression:

$$x(t) = \frac{1}{\sqrt{N}} \cdot \sum_{n=0}^{N-1} X_n \cdot e^{j \cdot 2 \pi \cdot n \cdot \Delta \cdot f \cdot t}, \ 0 \le t < N \cdot Te$$

Assuming that the variables $X_n$ are random, statistically independent and centered, we deduce from this the PAPR of the OFDM signal which is expressed as:

$$PAPR = \frac{\max_{0 \le t < N \cdot Te} \cdot |x(t)|^2}{E \cdot [|x(t)|^2]}$$

It is noted that, with this definition of PAPR, and x(t) being the transformation from the frequency domain to the time domain, for example by an IFFT, of discrete random variables, the PAPR can become as great as N in the particular but also very rare case where $\{X_k\}_{k=0}^{N-1}=1$.

In practice, PAPR peaks of a given amplitude occur according to a certain probability of appearance. It is, in particular, improbable that the amplitude of the signal will be as great as N, especially as N itself will be great. Thus, classically, to characterize a PAPR of an OFDM system, the complementary cumulative distribution function (CCDF) is used. This CCDF gives the probability of the amplitude of the signal being above a certain threshold. This function is the one most used to characterize PAPR reduction systems and has the following expression:

$$CCDF_{PAPR} = Pr[PAPR(X_L) > \gamma,$$
$$\approx 1 - (1 - e^{-\gamma})^N$$

In practice, this equation indicates for example that the signal cannot be accurately transmitted without saturation of samples of at least one symbol in a hundred with a signal comprising 2048 carriers if the digital-analog converters and/or analog-digital converters and the power amplifiers do not work with a difference in dynamic range between average power and peak power of at least 12.2 dB, which represents an operating power ratio of 1 to 16 for the amplifier.

Below this margin, the signal will be clipped or at least highly distorted with repercussions on transmission and reception conditions.

Prior Art for the Reduction of PAPR

In the literature, many techniques have already been proposed to overcome this problem.

A common solution consists in making sure that the range of operation of the amplifier remains limited to a linear amplifier zone, thus unfortunately limiting the yield of the amplifier (a few percent instead of, classically, 50%) and therefore a major increase in the consumption of the transmitter. This is a very great constraint for the use of OFDM, especially in mobile terminals, given that the consumption of the power amplifier can represent more than 50% of the total consumption of a terminal.

A second approach is that of applying a constraint or encoding on the data sequence sent out to limit the PAPR. This method consists in building a set of code words that minimizes the PAPR. Several techniques for building these codes have been proposed. The advantage of this solution lies in the fact that it does not introduce any distortion. By contrast, the spectral efficiency is penalized without even however providing any encoding gain. In addition, to date, its field of application is limited to the OFDM modulators with small numbers of carriers N owing to an excessively great complexity of computation.

A third approach, commonly called the TI-CES technique (Tone Injection-Constellation Extension Scheme), proposes to increase the number of points of the constellations that modulate the OFDM carriers so that a point of the original constellation can have numerous corresponding possibilities of coordinates in the new constellation. According to this approach, this additional degree of freedom is used to generate a signal of lower PAPR. However, this method has numerous drawbacks owing to the fact that the extension of constellation will lead to an increase in the average power of the signal since the additional symbols have higher power levels. In addition, the selection of the best possibility of coordinates for each point requires an increase in the complexity of the computation applied, making it unsuited to hardware implementation for the real-time processing of signals.

A fourth approach, commonly called the CD (Constellation Distortion) technique, is also based on a modification of constellations and relies on the assumption that the output level of the amplification of transmission is limited by higher PAPR peaks and that, if the amplitude of these peaks can be diminished, then the emitted power can be increased. According to this technique, for a given distortion rate, a problem of optimization called a convex optimization problem is resolved in order to prepare an OFDM signal with a minimum overall PAPR level. However, this method requires a very significant increase in the average output power to compensate for the loss in terms of signal-to-noise ratio. In addition, the complexity of computation implemented increases exponentially when the constellation order becomes high.

A fifth technique, commonly called the ACE ("Active Constellation Extension") technique is based on a modification of constellation and relies on a shift made towards greater distance from the decision axes. However, as in the above two methods, this technique is characterized by lower efficiency for the high-order constellations and by an increase in the average power of the signal, and by very high complexity of computation.

A sixth method, commonly called the TR (Tone Reservation) technique, proposes to reserve certain carriers of the OFDM multiplex which do not carry information but symbols optimized at transmission to reduce PAPR. These symbols can be optimized by using for example an SOCP (Second Order Cone Programming) type of convex optimizing algorithm. Just as in the previous method, this solution does not bring any distortion to the transmitted signal but a major drawback of this method lies in the fact that a certain number of carriers have to be reserved to make it possible to significantly reduce the PAPR. These carriers are not used to send payload information data, and this leads to a reduction of the spectral efficacy.

A seventh technique, called the "selected mapping" technique, consists in applying a phase rotation to each symbol of the sequence to be transmitted. Several phase rotation patterns can be defined. For each pattern applied to the sequence to be transmitted, operations are performed to obtain a corresponding OFDM signal and the one having the lowest PAPR is transmitted. Again, this technique provides no distortion but considerably increases complexity at transmission, since several processing operations have to be performed in parallel to then choose the most efficient one. Hence, although the other processing operations have been performed, they are not exploited. In addition, this technique makes it necessary to communicate the rotation sequence used at transmission to the receiver, and to do so with very high reliability. This leads to a reduction of spectral efficiency and a significant increase in the complexity of the system to convey the used rotation pattern applied via a dedicated channel. In addition, if this transmission is erroneous, the entire OFDM frame will be lost.

Finally, another approach is the "clipping" technique, which consists in clipping the amplitude of the signal when it goes beyond a predefined threshold. However, this clipping is by nature non-linear and introduces a distortion of the signal sent resulting not only in a degraded BER but also in a regrowth of the side lobes of the power spectral density (PSD).

In this particular context, the inventors have identified a need for a novel technique that improves the reduction of the PAPR while remaining simple to implement.

SUMMARY

The invention proposes a novel solution that does not have all these drawbacks of the prior art, in the form of a method for transmitting a multi-carrier signal representing a source signal comprising blocks each constituted by N carriers, called OFDM blocks, each carrier being modulated by a constellation symbol and being identified by an index n, n being an integer such that $0 \leq n \leq N-1$.

According to the invention, the method comprises the following steps for at least one OFDM block:
 a step of pre-processing implemented in the frequency domain comprising:
  a phase for pre-building complex time samples, delivering M pre-built complex time samples representing N carriers of the OFDM block, M being an integer, and
  a phase for correcting the constellation symbols that modulate the carriers of the OFDM block, the phase for correcting comprising the following steps, repeated for each carrier:
   detecting P samples, P being an integer, from among the M pre-built complex time samples coming from the pre-building phase when n=0, or from among the M complex time samples coming from an updating step implemented for a previous carrier when $0<n \leq N-1$, having power above a predetermined threshold, the step for detecting delivering P samples and M−P zero samples, constituting M complex time samples to be corrected,
   correcting the constellation symbol modulating the carrier according to said M complex time samples to be corrected, delivering a piece of complex correction data for correcting the constellation symbol, building M complex time samples associated with the piece of complex correction data, updating the M pre-built complex time samples, the updating implementing an accumulation associating, in sets of two, the M complex time samples associated with the piece of complex correction data, with the M pre-built complex time samples coming from the pre-building phase when n=0, or with the M pre-built complex time samples coming from an updating phase implemented for a previous carrier when $0<n\leq N-1$, delivering M complex time samples used for the following carrier.

a step of modulation implementing a transformation, from the frequency domain to the time domain, of a signal coming from said pre-processing step;

a step of transmission and/or storage of a signal coming from said step of modulation.

Thus, the invention relies on a novel and inventive approach to the reduction of the PAPR of an OFDM signal.

More specifically, the present invention improves the performance of PAPR reduction with a low complexity of computation as compared with the prior art techniques.

In addition, the present invention has high flexibility of modification of constellations as compared with the modifications of constellation imposed by the TI-CES, CD, ACE and TR techniques.

Indeed, the method according to the invention successively and in a controlled way modifies the constellation symbols modulating the carriers of an OFDM block in the frequency domain before implementing a transformation from the frequency domain to the time domain, for example an inverse fast Fourier transform (IFFT).

To this end, for the reduction of the PAPR, the invention uses a real-time control of the correction of a carrier, called a current carrier, as compared with the previously corrected carriers of a same OFDM block.

This real-time control is especially based on the implementing of a detection of P samples, P being an integer among the M pre-built complex time samples coming from the pre-building phase when n=0, or among M complex time samples coming from an updating step implemented for a preceding carrier when $0<n\leq N-1$ having power above a predetermined threshold ($\alpha$), the step for detecting delivering the P samples and M–P zero samples constituting M complex time samples to be corrected.

In other words, among the M pre-built complex time samples, at least one power peak (P=1) or a plurality (P>1) of power peaks above a predetermined threshold $\alpha$, is detected, the threshold value setting the level of the final PAPR sought.

Indeed, it must be noted that the number of power peaks varies from one carrier to another as and when the correction of the OFDM block goes ahead. Thus, it is possible for example to detect ten power peaks ($P_0$=10) for the carrier indexed n=0 and only one peak for the carrier indexed N−1 ($P_{N-1}$=1) because the nine other peaks have been sufficiently reduced by correction of the N−1 previous carriers.

The step for detecting according to the invention delivers M complex time samples to be corrected comprising on the one hand (M−P) complex time samples, namely samples whose value is set at zero corresponding to (M−P) time samples having power below the predetermined threshold and hence acceptable power relative to the desired PAPR, and on the other hand the P complex time samples detected.

Then, in taking account of the M complex time samples to be corrected, a piece of complex correction data is obtained. This piece of complex correction data is then used to define the correction to be made to the coordinates of the constellation symbol modulating the current carrier that is to be corrected.

Thus, at the end of the two pre-building and correction phases respectively mentioned here above, implemented for each of the N carriers, the "pre-building" is carried out in the frequency domain of the corrected time signal associated with the OFDM block considered.

The invention therefore enables an overall correction of the OFDM block in reducing, for each carrier, the set of power peaks whose amplitude is above the predetermined threshold $\alpha$ corresponding to the final PAPR level sought. Thus, the invention proposes an improvement over the PAPR reduction techniques aimed at correcting only one maximum power peak.

It must be noted that the term "pre-building" means that, even in the frequency domain, that the M time samples of the response of the signal that could be obtained after transformation from the frequency domain to the time domain, for example by an IFFT, are determined. Indeed, the invention seeks to correct the complex coordinates of the constellation symbols modulating a current carrier in the frequency domain.

The term "complex" is understood to mean that it is possible to have a real and/or imaginary value such that this value is for example defined by v=a+jb.

Such a method therefore leads to an overall correction of the OFDM time signal because each carrier of an OFDM block is corrected in taking account of the power peaks detected successively for each carrier. This correction is optimized because the complex shift of constellation coordinates is determined as a function of a piece of complex correction data evolving for each carrier as a function of the correction made on the previous carrier.

As described here below, such dependency between the complex shifting of constellation coordinates and the piece of complex correction data makes it possible to build a new constellation which can correspond for example and particularly to a modified and/or a combination of the constellations coming from the techniques of constellation modification previously cited, namely the TI-CES, CD, ACE and TR techniques.

In this configuration, one advantage of the technique proposed according to the invention is therefore being able to gain efficiency in making it possible to associate several constellation modification techniques, the respective distinct faults of which can compensate for each other to a certain extent through correction control based on the implementation of a real-time control between a current carrier to be corrected and the carriers that precede it in time and which have been previously corrected.

According to one particular embodiment of the invention, said piece of complex correction data results from the complex correlation of said M complex time samples to be corrected with M complex time samples associated with said carrier indexed n.

Such complex correlation operation makes it possible to prepare a piece of complex correlation data. The taking into account of this piece of complex correlation data and its evolution at each carrier enable the re-updating of the signal to progress towards the overall reduction of the peaks detected. Thus, the piece of complex correction data is the result of a complex correlation operation and is also called a piece of complex correlation data.

The implementing of the complex correlation according to the invention advantageously makes it possible to proportionally vary the correction of the constellation symbol modulating each carrier.

Thus, the invention avoids a fixed correction of each constellation symbol. Such a fixed correction can limit the reduction sought for the PAPR.

Indeed, since the number P of peaks above a predetermined threshold can vary from one carrier to another, the complex correlation operation makes it possible to obtain a result different from one carrier to another in taking account especially of the correction of the correction symbol of the previous carriers.

Thus, the implementing of the complex correlation according to the invention provides for fine optimizing of the reduction of the PAPR as compared with the techniques of the prior art.

According to one particular feature of the invention, the phase for pre-building complex time samples implements a step of oversampling such that M=N.L, L being an integer factor of oversampling. The method according to the invention builds M=L.N time samples with L≥1. When L=1 then M=N. When L>1, for example when L=2 or 4, there is oversampling. Such oversampling advantageously makes it possible to obtain higher resolution in the reduction of the PAPR.

According to one particular aspect of the invention, the pre-building phase comprises the following steps repeated for each carrier indexed n:
building of M complex time samples associated with the carrier,
storage of M complex time samples associated with the carrier, by accumulation associating, in sets of two, said M complex time samples associated with said carrier with M complex time samples associated with the previous carriers.

Thus, during the pre-building phase, for each carrier, we obtain M associated complex time samples, which will especially be used also by the complex correlation operation.

Besides, the accumulation of the M complex time samples associated with a current carrier indexed n with M complex time samples associated with the previous carriers makes it possible, once this accumulation processing operation has been applied to the N carriers, to obtain M pre-built complex time samples representing N carriers of the OFDM block considered even when the operation is in the frequency domain.

Advantageously, the step of correction implements a summation of the coordinates (for example An and Bn) of the constellation symbol (for example Xn=An+j.Bn), called original coordinates of the constellation symbol, with coordinates representing a complex shift (for example dn=dAn+j.dBn) of the constellation symbol on the x axis and y axis of the complex plane of the constellation of said symbol, said complex shift being selected by means of said piece of complex correction data from among the complex shifts belonging to at least one of the following categories:
negative real shift, negative imaginary shift respectively, of said complex shift, when the signs of the real part and of the imaginary part of said piece of complex correction data are identical;
positive real shift, positive imaginary shift respectively, of the complex shift when the signs of the real part and of the imaginary part of said piece of complex correction data are opposite.

The term "real shift of the complex shift" is understood to mean the shift along the axis of the real values of the real part of the complex shift. The term "imaginary shift of the complex shift" is understood to mean the shift along the axis of the imaginary values of the imaginary part of the complex shift. Indeed, the shifts of the real part and the imaginary part of the constellation symbol are independent of each other. For example, the real part of the constellation symbol can be shifted positively relative to the axis of the real values. Whereas the imaginary part can be shifted negatively relative to the axis of the imaginary values.

Thus, the invention proposes a control of the complex shift of each symbol of each constellation symbol modulating a carrier on the x axis and the y axis of the complex plane of the constellation of this symbol. We therefore obtain a controlled complex shift of the constellation symbols. This shift can be distinct, whether it is through its value of shift or again through its polarity, between one constellation symbol modulating one carrier to another constellation symbol modulating another carrier.

In other words, it is possible for example that the real and/or imaginary components of the constellation symbol modulating a carrier indexed n+g, with g as an integer such that 0≤n+g≤N−1, are corrected according to a positive real and/or imaginary shift having a value $d_g$ while the real and/or imaginary components of the constellation symbol modulating the carrier indexed n are corrected according to a negative real and/or imaginary shift having a value $d_n$=dAn+j.dBn.

Since the nature of the complex shift is controlled, the complex shifts implemented can lead to keeping the constellation points in their decision sector or in the original constellation or else to moving them outside.

Advantageously, the absolute value of the real part V1, imaginary part V2 respectively of the complex shift is proportional to the real part, or imaginary part respectively, of said piece of complex correction data.

High precision of correction is thus obtained, the values V1 and V2 according to the above example being proportional to the piece of complex correction data (also called complex correlation data) resulting from the previously mentioned complex correlation. In other words, the real components of the two symbols S1 and S2 of distinct constellations modulating two distinct carriers can be corrected by two distinct shift values $dA_g$ and $dA_n$, just as the imaginary components $dB_g$ and $dB_n$ are distinct from one symbol to another. Similarly, for a same given n-order carrier, the values V1 and V2 and therefore $dA_n$ and $dB_n$ which result therefrom are distinct because the shifts of the real part and of the imaginary part of the constellation symbol are independent of each other.

The value of shift therefore varies from one carrier to another according to the complex correlation in taking account of the P power peaks detected among the M pre-built complex time samples resulting from the pre-building phase when n=0 or among M complex time samples coming from an updating step implemented for a preceding carrier when 0<n≤N−1.

According to one particular aspect of the invention, the correction step also implements a weighting of the real part, and of the imaginary part respectively, of the complex shift according to said original coordinates of said constellation symbol.

Indeed, in the case of constellations dictated by the ACE technique, for example, corrective shifts of the coordinates of the constellation symbol towards the exterior of the original constellation are not permitted except for symbols situated on the periphery of the constellation. The weighting carried out according to the invention therefore enables compliance with rules proper to the techniques of the prior art such as the ACE technique or again a combination of these techniques, for example the CD and ACE techniques.

According to one particular aspect of the invention, the method of transmission furthermore comprises a step for weighting the piece of complex correction data by a weighting factor.

Such a weighting makes it possible especially to homogenize the amplitudes of correction of the constellation symbols.

According to one alternative embodiment of this particular aspect of the invention, the weighting factor varies from one carrier to another according to the value of the index n of the carrier.

Indeed, the dynamic range of the correlation signal at the beginning of the correction of an OFDM block is very high as compared with the end of the block, where the peaks remaining to be corrected are small in number and the amplitude at which they exceed the predetermined threshold is low. As a consequence, the deviations of correction are very great at the outset with, for example, a very high error rate according to the CD technique and become almost zero at the end of the processing.

Making the weighting factor vary according to the invention from one carrier to another as a function of the value indexed n homogenizes the correction on the "duration" of the OFDM block. Thus, the correction is "smoothened" on the entire "duration" of an OFDM block.

This alternative embodiment therefore especially permits to very significantly reduce the error rate as compared with the use of the CD technique. It also very significantly reduces the amplitudes of the peaks of the constellation deviations, which could lead to saturations.

According to another particular aspect of the invention, the method of transmission comprises a step of normalisation of the piece of complex correction data.

This step of normalisation is a variant of the weighting step as a function of the value of the index n of the previously mentioned carrier. This alternative therefore is aimed also at homogenizing the dynamic range of correction on the entire OFDM block considered.

According to one particular aspect of this variant, the normalisation implements a multiplication by a positive constant, said constant being identical for each normalisation step implemented for each carrier of an OFDM block and said constant being proportional and/or inversely proportional to the value of at least one parameter belonging to the group comprising:
  said predetermined threshold α enabling said detection of said P samples;
  the number N of said carriers of said OFDM block;
  a parameter representing an efficiency of correction to be applied to said constellation symbol.

According to another particular aspect of the invention, said predetermined threshold α varies from one carrier to another according to the value of said index n of said carrier, n being an integer such that $0 \le n \le N-1$.

This variation in the value of the predetermined threshold used for the detection of the power peak or peaks is another alternative aimed at homogenizing the dynamic range of correction on the entire OFDM block considered.

According to one particular embodiment of the invention, the method for transmitting furthermore comprises a switching step enabling the transfer of said M pre-built complex time samples coming from said pre-building phase to the input of said phase for detecting of said correction phase.

The invention also pertains to a transmission device for transmitting a multi-carrier signal representing a source signal comprising blocks each constituted by N carriers, called OFDM blocks, each carrier being modulated by a constellation symbol and being identified by an index n, n being an integer such that $0 \le n \le N-1$.

According to the invention, the transmission device comprises, for at least one OFDM block:
  a pre-processing unit implemented in the frequency domain comprising:
    a module for pre-building complex time samples delivering M pre-built complex time samples representing N carriers of said OFDM block, M being an integer, and
    a correction module for correcting constellation symbols that modulate the carriers of said OFDM block, said correction module comprising the following entities repeated for each carrier:
      an entity for detecting P samples, P being an integer, among said M pre-built complex time samples coming from said pre-building phase when n=0, or among M updated pre-built complex time samples coming from an updating entity implemented for a preceding carrier when $0 < n \le N-1$, having power above a predetermined threshold, said detection entity delivering said P samples and M−P zero samples constituting M complex time samples to be corrected,
      an entity for correcting the constellation symbol modulating said carrier as a function of said M complex time samples to be corrected, delivering a piece of complex correction data for correcting said constellation symbol,
      an entity for building M complex time samples associated with said complex correction data,
      an updating entity for updating said M pre-built complex time samples, said updating entity implementing an accumulator associating, in sets of two, said M complex time samples associated with said piece of complex correction data with said M pre-built complex time samples coming from said pre-building module when n=0, or with said M complex time samples coming from an updating entity implemented for a preceding carrier when $0 < n \le N-1$, delivering M complex time samples used for the following carrier,
  a modulator implementing a transformation, from the frequency domain to the time domain, of a signal coming from said pre-processing unit;
  a unit for the transmission and/or storage of a signal coming from said modulator.

A transmission device of this kind is especially capable of implementing the method of transmission according to the invention as described here above.

According to one particular embodiment, said correction entity comprises:
  means for summating the coordinates of said constellation symbol, called original coordinates of said constellation symbol, with coordinates representing a complex shift of said constellation symbol on the x and y axes of the complex plane of the constellation of said symbol, and means for weighting the real part and imaginary part respectively of said complex shift according to said original coordinates of said constellation symbol.

The invention also pertains to a computer program comprising instructions for implementing a method of transmission as described here above, when this program is executed by a processor.

BRIEF DESCRIPTION OF THE DRAWINGS

Other features and advantages of the invention shall appear more clearly from the following description of a particular embodiment given by way of a simple illustrative and non-exhaustive example and from the appended figures, of which:

FIGS. 1A and 1B respectively represent the an OFDM signal process diagram and a simplified block diagram of the PAPR-reducing system according to the invention;

FIG. 7 illustrates two types of corrected constellations obtained according to the invention;

FIGS. 8A to 8D respectively illustrate a comparison between an original constellation and a corrected constellation according to the invention for an QAM64 type modulation and a QAM16 type modulation.

DETAILED DESCRIPTION OF ILLUSTRATIVE EMBODIMENTS

General Principle

Figure 2:
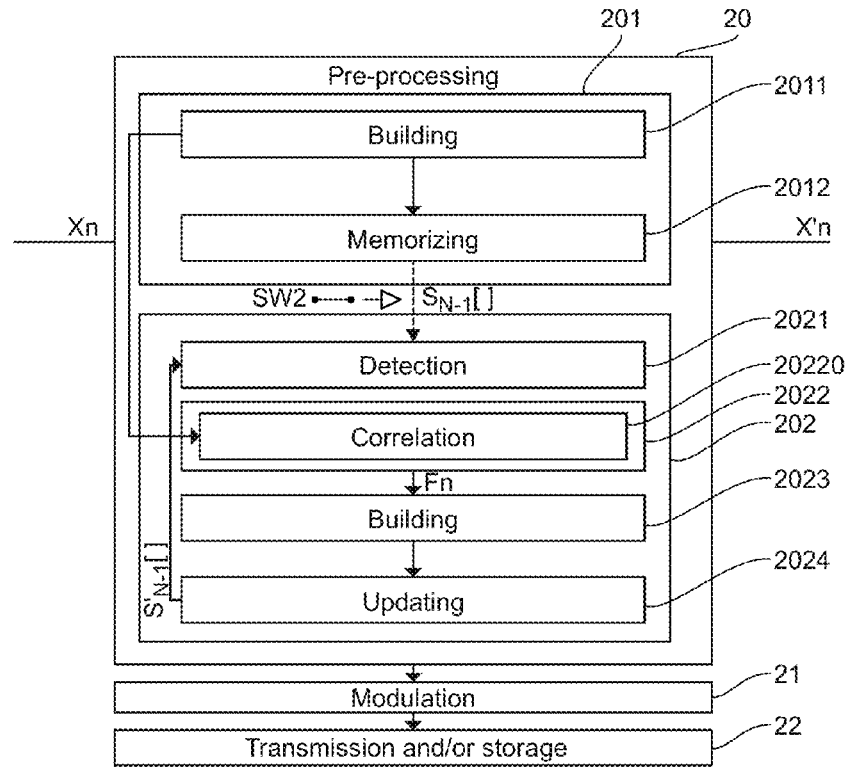
FIG. 2 illustrates the main steps of a method of transmission according to the invention.

The invention therefore relies on the use of a correction control of the constellation modulating the OFDM signal so as to optimally reduce the peak-to-average-power ratio, or PAPR.

More specifically, the invention implements a phase of pre-building of a complex digital signal representing an OFDM block of the signal obtained without correction at output from the transmission device.

Once the pre-building of the digital signal representing an OFDM block has been done, the method of the invention implements a correction phase which, for each carrier, detects especially the PAPR peaks within the set of pre-built complex time samples, representing the N carriers of the previously pre-built OFDM block.

The peaks detected thus correspond to peaks of an amplitude above a predetermined threshold corresponding to the final PAPR level sought for the entire OFDM block which "would be" obtained without correction at output of the transmission device. Correcting such a set of peaks at each carrier offers an improvement as compared with the PAPR reduction techniques aimed at correcting a single maximum power peak.

Indeed, detecting these peaks for each carrier on the entire "duration" of the OFDM block makes it possible to obtain progress, carrier by carrier, in the overall reduction of the peaks of the signal above the predetermined threshold corresponding to the final PAPR level sought.

In the presence of these peaks, the method according to the invention delivers a piece of complex correction data enabling the optimizing of the modifying of the constellation associated with the carriers of the OFDM signal in order to reduce these peaks.

In particular, for each carrier considered, the piece of complex correction data results from a complex correlation between:

on the one hand, the time samples corresponding to the power peaks, of an amplitude above a predetermined threshold, that are detected among said M pre-built complex time samples coming from said phase of pre-building when n=0, or among M complex time samples coming from an updating step implemented for a preceding carrier when 0<n≤N−1, and on the other hand, the complex time samples associated with said carrier considered.

The invention therefore makes it possible, carrier by carrier, to adapt the constellation of the signal to be emitted.

Novel signal modulation constellations enabling a reduction of the PAPR are therefore obtained according to the invention.

Here below referring to FIG. 1A, we describe the general scheme of processing of an OFDM signal aimed at reducing the PAPR. According to the embodiment as described by the general diagram with reference to FIG. 1A, an OFDM signal is processed according to a succession of steps:

at transmission 1000: generation 101 of source data, encoding and interlacing 102 of said data delivering interlaced data, modulation of said interlaced data 103 for example according to a QAM modulation, insertion 104 of pilot carriers, correction 105 of the OFDM symbols aimed at reducing the PAPR according to the method of the invention, OFDM modulation 106 carrying out a transformation from the frequency domain to the time domain, for example by an inverse fast Fourier transform (IFFT) delivering OFDM symbols, transmission 107 of said OFDM signal on a transmission channel 108 in the presence of noise, for example a Gaussian white noise 109;

and at reception 1010: reception 110 of a signal called a received signal, OFDM demodulation 111 of said received signal implementing a fast Fourier transform (FFT) delivering a transformed received signal, channel estimation 112, demodulation 113 of said transformed received signal delivering a demodulated signal, de-interlacing and decoding 114 of said demodulated signal, determining the binary error rate or bit error rate 115.

The invention therefore proposes a specific correction technique 105 that enables the efficient reducing of the PAPR while at the same time being simple to implement. In addition, the correction according to the invention is implemented only at transmission and does not require modifications of existing receivers.

The method of PAPR reduction 105 according to the invention is presented in the simplified block diagram of FIG. 1B. More specifically, the essential steps of the method of transmission according to the invention are implemented in the frequency domain between the classic steps of insertion 104 of pilot carriers and OFDM modulation 106 implementing especially an inverse fast Fourier transform.

More specifically, according to FIG. 1B, the method according to the invention corresponds to a feed-back type automatic control system imbricated with a feed-forward type automatic control system.

This method is non-iterative. In other words, a correction applied to a block of N carriers (N also corresponding to the size of the fast Fourier transform and that of the inverse fast Fourier transform) is entirely computed in a duration of N complex time samples at the frequency Fe.

As described in detail here below with reference to FIG. 2, the working of the method consists of a phase for the pre-building of the complex time signal that could be obtained at output of the transmission device from the sequence of the different carriers of an OFDM block m that are modulated by constellation symbols. This phase of pre-building is done by means of a storage and pre-building module 1055 comprising a storage entity M1 represented in FIG. 1B, before transformation from the frequency domain into the time domain, for example by an inverse fast Fourier transform (IFFT).

For each carrier modulated by a symbol Xn, a simultaneous computation is made of all the complex time samples of its temporal response that could be obtained after inverse fast Fourier transform if this carrier were to be transformed in the time domain in an isolated manner.

It must be noted that the processing of the complex time signal, and not simply the real time signal, implies a processing of a number M of a time samples (real and imaginary), twice as great as in the case of the processing of a real time signal.

Then, the different time responses of each carrier are collected in the pre-building and storage module 1055 which outputs a signal vector $S_{N-1}[\ ]$ sized M constituted by the set of M samples computed in parallel for the N carriers of the OFDM block without any correction being implemented. Thus, the pre-building and storage module 1055 delivers an "image" of the complex time signal that would be obtained for the OFDM block considered.

Then, the vector $S_{N-1}[\ ]$ obtained on the duration of the OFDM block considered is transferred to a correction and updating module 1051 provided with a storage entity M2 to be then used by a detection module 1050.

The correction and updating module 1051 is therefore initialized with the vector $S_{N-1}[\ ]$ through the switching of a switch SW2 enabling the storage entity M1 of the pre-building and storage module 1055 to be connected to the storage entity M2 of the correction and updating module 1051.

The storage entity M1 of the pre-building and accumulation module 1055 is therefore reset at zero and the pre-building of the corresponding time signal corresponding to the next OFDM block m+1 starts.

In the correction and updating module 1051, the sequence of constellation symbols of the OFDM block indexed m are transited in a delay line 1057. This causes the first symbol $X_0$ to come out when said storage entity M2 has just been initialized by connection with the storage entity M1. The switch SW2 connecting the storage entities M1 and M2 is then disconnected and remains in this state for the entire duration of the OFDM block indexed m (as shown in FIG. 1B).

In the correction and updating module 1051, for the carrier indexed n=0, the first step implemented is the detection 1050 of the appearance of any power peak higher in absolute value than a predetermined threshold $\alpha$ on a particular sample of the set of M complex time samples of the vector $S_{N-1}[\ ]$. This step of detection isolates a set comprising P complex time samples having amplitudes in absolute value above the predetermined threshold $\alpha$, the other M−P complex time samples having amplitudes below the threshold $\alpha$ being set at zero.

The predetermined threshold value $\alpha$ makes it possible especially to fix the desired PAPR level. The P complex time samples to be corrected and the M−P zero time samples form a set of M complex time samples called "M complex time samples to be corrected".

A complex correlation operation 1052 is then applied to the M complex time samples to be corrected and to the M complex time samples associated with the carrier indexed n=0 generated by an entity for generating complex time samples also feeding the pre-building and storage module 1055. This results in a piece of complex correction data Fn, the value of which is used to implement a proportional shift of the constellation symbol modulating the carrier indexed n=0 as illustrated here below according to the examples of FIG. 5A to 5C.

Since the set of complex time samples associated with the OFDM block indexed m have been preliminarily built, the detection of P peaks is directly relevant because the peaks detected are truly representative of the PAPR peaks of the OFDM block indexed m which would be sent without correction.

The invention therefore enables an overall correction of the OFDM block by reducing, for each carrier, the set of power peaks whose amplitude is higher than the predetermined threshold $\alpha$ corresponding to the final PAPR level sought. Thus, the invention proposes an improvement as compared with the PAPR reducing techniques aimed at correcting only one maximum power peak.

The piece of complex correction data Fn computed for the first carrier indexed n=0 of the OFDM block indexed m from the vector $S_{N-1}[\ ]$, comprises a delayed clock cycle, represented by a black vertical bar 1054, that is delayed relative to the symbol $X_0$ because an evaluation registered at a frequency Fe is made at output of the correction and updating module. Thus, at each edge of this clock cycle, a new input, namely a constellation symbol Xn is loaded and/or a new output is updated, namely a corrected constellation signal X'n, and the corresponding values are then maintained during a clock cycle.

Depending on the piece of complex correction data Fn, a weighting module 1053 applies a weighting of the constellation correction modifying the coordinates of the constellation $X_0$ in imposing a weighted complex shift $d_0$ on it.

The additional weighting module 1053 enables the weighting of the correction shifts according to the location of the constellation symbol. Indeed, according to the ACE technique, external shifts are permitted only for symbols situated on the periphery of the constellation.

Such a complex shift $d_0$ is taken into account to then update the vector $S_{N-1}[\ ]$. This has the effect, at the next phase correction implemented for the carrier indexed n=1, of reducing the amplitude of the peak detected for the OFDM block indexed m relative to what it could have been done without correction.

This updating will then produce a new value of the vector $S'_{N-1}[\ ]$, of the sequence of complex time samples pre-built in parallel with a constraint of regression on the higher-level samples.

Thus, at the first carrier indexed n=0 of the OFDM block m, the PAPR peaks of the strongest level will therefore be reduced.

The method according to the invention is then reproduced at each new constellation symbol associated with each carrier, in other words for all the N−1 following carriers, so as long the amplitude of the peak detected has not returned to a comparable level or a level below that of the other peak levels of the signal. The correction phase according to the invention is terminated at the end of the current OFDM block once all the carriers that constitute it have been scanned and corrected if necessary.

The correction and updating module 1051 is then reset to process the vector $S_{N-1}[\ ]$ associated with the next OFDM block m+1 and transmitted by the pre-building and storage module 1055.

Consequently, the correction of the PAPR peaks of an OFDM block indexed m is improved carrier by carrier on the entire duration N of this OFDM block.

Throughout the OFDM block indexed m, in other words as and when the N carriers of the OFDM block indexed m are traversed, the method according to the invention will therefore determine a sequence of complex correction shifts $dn=dAn+j.dBn$, which will be variable from one carrier to the next as a function of the result of the complex correlation operation. These complex correction shifts dn are thereafter combined with the original constellation symbols Xn to form a sequence of symbols X'n leading to a lower PAPR after OFDM modulation 106 implementing especially an inverse fast Fourier transform and taken into account in the updating of the vector $S_{N-1}[\ ]$ performed for each carrier.

Figure 3:
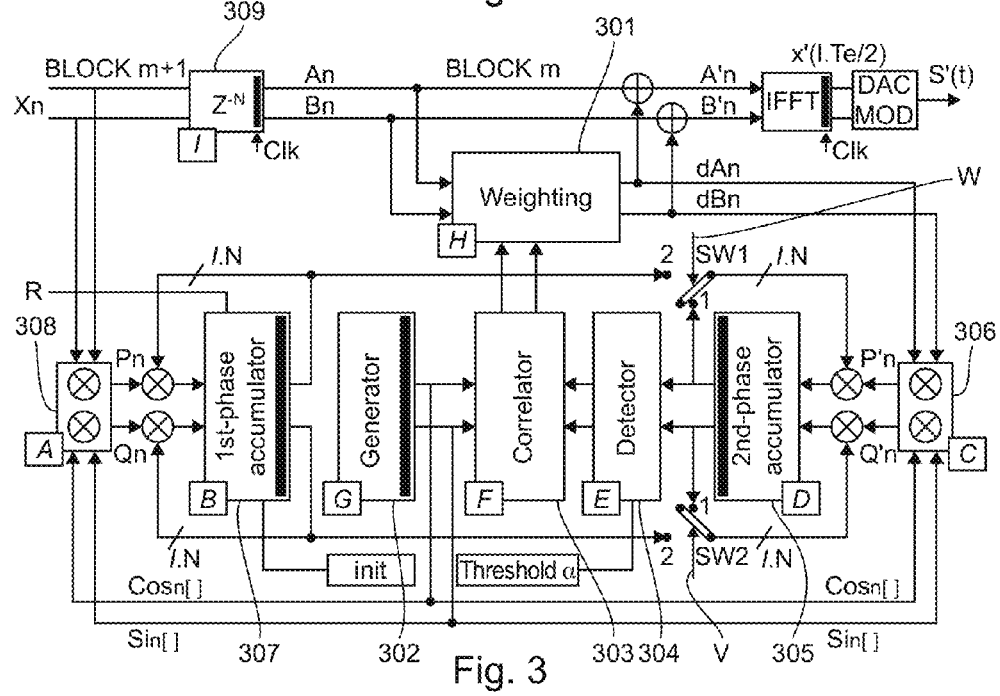
FIG. 3 illustrates a detailed block diagram of the PAPR-reducing system according to the invention.

Detailed Description and Implementation of the Different Steps of the Method of Transmission According to the Invention FIG. 2 represents a detailed view of the set of steps implemented according to the invention in order to prepare a correction of the constellation that modulates each carrier of an OFDM block, in doing so in order to reduce the PAPR of the signal transmitted while FIG. 3 represents the physical implementation of these steps. These two aspects are described in detail here below.

Description of the Different Steps of the Method According to the Invention

Thus, as illustrated in FIG. 2, the method of transmission according to the invention enabling the application of a correction of the modulation constellation in order to reduce the PAPR of the transmitted signal comprises, a step of pre-processing (20) implemented in the frequency domain before the implementing of a transformation from the frequency domain to the time domain, for example by an inverse fast Fourier transform (IFFT).

More specifically, this pre-processing step (20) comprises a phase (201) of pre-building of a set of M pre-built complex time samples representing all the N modulated and multiplexed carriers of an OFDM block indexed m, M being an integer.

In particular, the M complex time samples are obtained by application of an oversampling such that M=N.L, L being an integer factor of oversampling.

Indeed, the reduction of PAPR must be applied to the time signal, which would be sent without correction at output of the OFDM transmission device.

Figure 4:
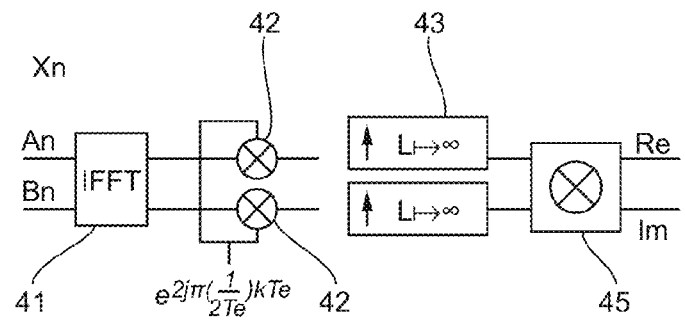
FIG. 4 illustrates different sub-steps implemented by the method according to the invention.

More specifically, for each carrier modulated by a constellation symbol, the pre-building phase (201) performs a processing operation equivalent to the one comprising successively at least one of the sub-steps represented with reference to FIG. 4.

Starting from the sequence of constellation symbols that modulate the carriers, each constellation symbol Xn being defined by a pair of values (An, Bn) which define the coordinates of the constellation symbol Xn in a complex plane such that $Xn=An+j.Bn$, the method according to the invention pre-builds a digital real signal representing the radiofrequency analog signal that would be obtained at output of the transmission device.

To this end, in the method according to the invention, we consider first of all the implementing of a transformation from the frequency domain to the time domain, for example by an inverse fast Fourier transform (IFFT) (41) performed on the real components (An) and imaginary components (Bn) of the constellation symbol Xn.

We then obtain the following expression at the output of a transformation from the frequency domain to the time domain, for example by an inverse fast Fourier transform (IFFT) at $t=k.Te$, with $0 \leq k < K = N$ and $K.Te = T$, the duration of the OFDM block considered:

$$x(k \cdot Te) = \sum_{n=0}^{N-1} X_n \cdot e^{2 \cdot j \cdot \pi \cdot \frac{n}{T} \cdot k \cdot Te}$$

Then, a transposition (42) of the real and imaginary baseband components is done according to the equation:

$$y(k \cdot Te) = \sum_{n=0}^{N-1} \cos(k \cdot \pi) \cdot X_n \cdot e^{2 \cdot j \cdot \pi \cdot \frac{n}{N} \cdot k}$$

Then, an oversampling (43) is carried out at a frequency equal to L.Fe of the real and imaginary components in baseband according to the following equation:

$$y\left(l \cdot \frac{Te}{L}\right) = \sum_{n=0}^{N-1} \cos\left(l \cdot \frac{\pi}{L}\right) \cdot X_n \cdot e^{2 \cdot j \cdot \pi \cdot \frac{n}{N} \cdot \frac{l}{L}}$$

with $t=k.Te$, and $0 \leq l < L.K$.

An ideal analog-digital conversion is also carried out when L tends towards infinity:

$$z(t) = \lim_{L \to \infty} y\left(l \cdot \frac{Te}{L}\right)$$

Then, a modulation (45) of the components at a frequency v is carried out in compliance with the following equation: $R(t)=Re[z(t) \cdot U(t)]$ with $U(t)=e^{2 \cdot j \cdot \pi \cdot v \cdot t}$, or again $\arg[z(t)]=\theta(t)$:

$$R(t)=|z(t)|Re[e^{j\theta(t)} \cdot e^{2 \cdot j \cdot \pi \cdot v \cdot t}]$$

It must be noted that, with respect to the goal of the invention, the envelope of the signal R(t) should not go beyond the threshold $\alpha$ and should therefore verify the following equation: $|R(t)| < \alpha, \forall v$. This leads by equivalence to: $|z(t)|Re[e^{j\theta(t)} \cdot e^{2 \cdot j \cdot \pi \cdot v \cdot t}] < \alpha$, $\forall v$ and by simplification $|z(t)| < \alpha$.

It is then deduced therefrom that the digital signal $y(l.Te/L)$ must verify:

$$\left| y\left(l \cdot \frac{Te}{L}\right) \right| = \left| \sum_{n=0}^{N-1} \cos\left(l \cdot \frac{\pi}{L}\right) \cdot X_n \cdot e^{2 \cdot j \cdot \pi \cdot \frac{n}{N} \cdot \frac{l}{L}} \right| < \alpha \forall L$$

which can be obtained when $$\left|x\left(l\cdot\frac{Te}{L}\right)\right| = \left|\sum_{n=0}^{N-1} X_n \cdot e^{2 \cdot j \cdot \pi \cdot \frac{n}{N} \cdot \frac{l}{L}}\right| < \alpha, \forall L.$$

It must be noted that in practice it is not possible to envisage being able to oversample the signal by a factor as great as is desired to enable verification of the above equation. However, it is known and especially disclosed in the document "*An Overview of Peak-to-Average Power Ratio, Reduction Techniques for OFDM Signals*" (T. Jiang, Y. Wu, IEEE Trans. On Broadcasting, vol. No 2 June 2008), that from an oversampling factor of 4, there is almost no longer any development of the curve of the complementary cumulative distribution function (CCDF) when L increases since for L=16 the two curves are practically coincidental.

It is therefore possible to fix a relatively low oversampling factor L and the difference between the PAPR of the digital signal that has been obtained and that which will be really observed on the analog signal is estimated from the results of the document cited here above.

Here below, we consider for example an oversampling factor L equal to 2. Indeed, this oversampling value is an efficient compromise between the increase of complexity and the efficiency sought for the PAPR reduction system.

The expression of the digital signal must therefore verify:

$$\left|x\left(l\cdot\frac{Te}{L}\right)\right| = \sqrt{\left[\sum_{n=0}^{N-1} P_{n,l}\right] + \left[\sum_{n=0}^{N-1} Q_{n,l}\right]} < \alpha$$

with: $\sum_{n=0}^{N-1} P_{n,l} = \text{Re}\left[x\left(l\cdot\frac{Te}{L}\right)\right]$ and $\sum_{n=0}^{N-1} Q_{n,l} = \text{Im}\left[x\left(l\cdot\frac{Te}{L}\right)\right]$, in other words:

$P_{n,l} = \left[A_n \cos\left(2\cdot\pi\cdot\frac{l}{L}\cdot\frac{n}{N}\right) - B_n \sin\left(2\cdot\pi\cdot\frac{l}{L}\cdot\frac{n}{N}\right)\right]$, $Q_{n,l} = \left[B_n \cos\left(2\cdot\pi\cdot\frac{l}{L}\cdot\frac{n}{N}\right) + A_n \sin\left(2\cdot\pi\cdot\frac{l}{L}\cdot\frac{n}{N}\right)\right]$ and for L = 2:

$P_{n,l} = \left[A_n \cos\left(\pi\cdot l\cdot\frac{n}{N}\right) - B_n \sin\left(\pi\cdot l\cdot\frac{n}{N}\right)\right]$, $Q_{n,l} = \left[B_n \cos\left(\pi\cdot l\cdot\frac{n}{N}\right) + A_n \sin\left(\pi\cdot l\cdot\frac{n}{N}\right)\right]$.

In order to be able to act on the PAPR level of the signal, the method according to the invention pre-builds the real and imaginary parts of the time signal $$x\left(l\cdot\frac{Te}{L}\right)$$

directly obtained at output of a transformation from the frequency domain to the time domain, for example by an IFFT. For L=2, 2.N samples for each real and imaginary component are pre-built so that the principle can be applied for all the frequencies of the radio spectrum. Thus, no constraint in terms of carrier frequency is applied.

Thus, this approach averts the situation of being in the particular case of a carrier frequency equal to Fe/2, which is a particular case of transmission of a real signal in the frequencies belonging to baseband, which however requires a minimum complexity of implementation. This has little application to any system.

Thus, the resulting signal without correction $$s\left(l\cdot\frac{Te}{L}\right)$$

coming from the modulation (45) is obtained at the end of the pre-building phase (201) and is thereafter used as a reference in the correction phase (202). Thus, the goal of the pre-building phase (201) is to obtain a complex digital signal that is representative from the dynamic viewpoint and peak values of the analog signal at output of the transmission device, in other words an "image" of the analog signal at output of the transmission device.

Thus, as illustrated in FIG. 2, for a current carrier indexed n modulated by a constellation symbol Xn, n being an integer such that $0 \leq n \leq N-1$, the pre-building phase (201) comprises a step for building (2011) a set of M=L.N complex time samples associated with each current carrier indexed n, L being an integer equal to 2 for example.

Thus, for each current carrier indexed n, the building step described here above delivers a set of 2.N complex time samples (because according to this example L=2) associated with the current carrier indexed n.

Then, the pre-building phase (201) of the transmission method 20 according to the invention comprises a step of memorizing 2012 and of accumulation that associates, in sets of two, the M complex time samples associated with the current carrier indexed n, with the previously memorized set of M complex time samples associated with the n previous carriers.

Once the set of N carriers has been processed according to these two steps of building (2011) and memorizing (2012), we therefore obtain, at the end of the pre-building phase (201), a signal vector $S_{N-1}[\ ]$ constituted by the set of complex samples previously computed in parallel for the N carriers of the OFDM block without any correction being implemented.

Then, the transmission step 20 according to the invention comprises a phase of correction (202) of this signal vector $S_{N-1}[\ ]$ transferred by activation of a switch SW2 enabling the pre-building module and the correction module, respectively implementing the pre-building phase and the correction phase, to be connected.

Then, once this transfer (shown in FIG. 2 by a line of dots and dashes) has been carried out, the correction phase becomes independent of the pre-building phase by the opening of the same switch SW2.

The correction phase (202) permits to progressively correct the signal vector $S_{N-1}[\ ]$ without correction coming from the pre-building phase (201). More specifically, a correction is made progressively, carrier by carrier, by small complex shifts that are variable from one carrier to another (dAn, dBn), of each original value of the real and imaginary components (An, Bn) of a constellation symbol, modulating a carrier in order to obtain a pre-built and corrected signal, the PAPR of which is reduced.

Thus, for the modulated carrier indexed n=0 by a constellation symbol $X_0$, the correction phase (202) implements a step for detecting (2021) P complex time samples, P being an integer, corresponding to power peaks, the amplitude of which is above a predetermined threshold α, among the complex time samples of the signal vector $S_{N-1}[\ ]$.

Among the complex time samples of the signal vector $S_{N-1}[\ ]$, for example, for a number M=256, ten peaks corresponding to the: fourth, twentieth, fifty-fifth, seventyeighth, hundredth, hundred-and-twenty-second, hundred-and-fifty-first, hundred-and-seventy-third, hundred-and-ninety-fifth and two-hundred-and-twentieth complex time samples of the signal vector $S_{N-1}[\ ]$ are detected.

The step of detection delivers these P=10 samples and the other M−P=246 time samples are reset to zero to form a set of M complex time samples to be corrected.

Then, the correction phase (202) of the method of transmission 20 according to the invention comprises a second step of correction 2022 of the constellation symbol $X_0$ modulating the current carrier indexed n=0 as a function of the set of M complex time samples to be corrected coming from the detection step (2012) described here above, delivering a piece of complex correction data $F_0$ of the constellation symbol modulating the current carrier.

More specifically, the complex correction data $F_0$ results from an operation of complex correlation (20220) of the M complex time samples to be corrected comprising the P=10 samples, the amplitude of which is greater than the predetermined threshold α coming from the detection step 2021, and the M complex time samples associated with the current carrier n=0.

The correction step 2022 implements a summation of the coordinates of the constellation symbol $X_0$, called original coordinates of the constellation symbol, with coordinates representing a complex shift ($dA_0$, $dB_0$) of the constellation symbol on the x and y axes of the complex plane of the constellation of the symbol. This complex shift is selected by means of the piece of complex correction data $F_0$ from among the complex shifts belonging to the at least one of the following categories:

real shift, respectively imaginary shift, of the negative complex shift when the signs of the real part and of the imaginary part of the piece of complex correction data $F_0$ are identical;

real shift, respectively imaginary shift, of the positive complex shift when the signs of the real part and of the imaginary part of the piece of complex correction data $F_0$ are opposite.

In addition, according to one particular feature of the invention, the absolute value of the real part, imaginary part respectively, of said complex shift is proportional to the real part, imaginary part respectively, of the piece of complex correction data $F_0$.

Once this selected complex shift of the piece of complex correction data $F_0$ has been selected, the original coordinates ($A_0$, $B_0$) of the constellation symbol $X_0$ are summated with the coordinates ($dA_0$, $dB_0$) of the selected complex shift and this summation delivers new coordinates ($A'_0$, $B'_0$) of the corresponding corrected constellation symbol $X'_0$.

The complex correction shift is therefore done in the reverse sense of the formation of PAPR peaks and is done variably from one carrier to another. Indeed, since the method leads to an overall diminishing of the signal peaks from one carrier to another, the set of M complex time samples to be corrected also varies from carrier to another and therefore the piece of correction data relative to a carrier too. We therefore obtain a series of complex shifts that evolve from one carrier to the next one adaptively with regard to the overall level of PAPR sought.

However, and logically, two successive carriers can also each have a complex shift close to their respective constellation symbols or can even be identical.

Should n≥1, for example n=5, the step of detection (2021) is performed among the complex time samples of the updated signal vector $S'_{N-1}[\ ]$ taking account, by accumulation, of the corrections associated with the five previous carriers, namely the carriers indexed 0, 1, 2, 3 and 4.

Then, the correction phase (202) of the method of transmission 20 according to the invention comprises a step for building (2023) a set of M pre-built complex time samples associated with the piece of correction data of the carrier, in other words, the complex shift defined earlier.

Then, the correction phase (202) of the method of transmission 20 according to the invention includes a step for updating 2024 the signal vector $S_{N-1}[\ ]$ by associating, in sets of two, the M complex time samples of the vector signal $S_{N-1}[\ ]$ with the set of M pre-built complex time samples (coming from the building step 2023 here above) representative of the complex shift dn of the correction made delivering a vector signal $S'_{N-1}[\ ]$ used for the next carrier.

All the steps of detection (2021), correction (2022), building (2023) and updating (2024) are applied to each of the N carriers.

Once these N carriers have been processed, we therefore obtain a corrected OFDM block at the end of the correction phase 202 of the pre-processing step (20) in the frequency domain. This corrected OFDM block is then transmitted (21) by a transformation from the frequency domain into the time domain, for example by an inverse fast Fourier transform (IFFT) and an operation of modulation by carrier frequency U(t).

Then, the signal coming from the modulation step (21) is transmitted and/or stored (22).

Physical Implementation of the Different Steps of the Method According to the Invention According to the diagram of FIG. 3, the implementation of the method according to the invention comprises nine processing modules 301 to 309 as described here below.

As compared with the conventional sequence which generates a signal S(t) from the sequence of values ($A_n$,$B_n$) of the coordinates in the complex plane that define a constellation symbol $X_n$ ($X_n=A_n+j.B_n$) being transformed by a transformation from the frequency domain to the time domain, for example by an IFFT, the method according to the invention, at the end of the second correction phase (202), generates corrected values ($A'_n$,$B'_n$), carrier by carrier, which, after transformation from the frequency domain to the time domain and modulation, will give a corrected signal S' (t) in which the PAPR peaks that affect S(t) have been attenuated so as to be below a predetermined threshold α.

To this end, during the first pre-building phase (201) described here above, the method according to the invention pre-builds firstly gradually by accumulation and simultaneously the set of samples of the signal S(l.Te/2) on the duration of an OFDM block.

More specifically, the entity for generating complex time samples 302 inputs the set of constellation symbols $X_n$ of an OFDM block indexed m of N carriers and simultaneously computes the sequence of the M=N.L=2.N samples of the complex time response that would be obtained after transformation from the frequency domain to the time domain, for example by an IFFT.

The entity 302 for generating a multi-carrier signal therefore, at each constellation symbol $X_n$, delivers the sequence of 2.N (L=2) complex time samples in cosine and sine of the carrier that corresponds to it in the N-sized OFDM block.

At each clock stroke, all the samples of the signal S(l.Te/2) are thus pre-built gradually by accumulating, in the memorizing entity 307, the current computation results with the different results of the pre-building performed earlier.

For example, the cosine and sine samples of the carrier indexed n, constituting the elements of the vectors $COS_n[\ ]$ and $SIN_n[\ ]$, are defined as follows:

$$COS_n[\ ] = \begin{bmatrix} 1 \\ \cos\left(\pi \cdot \frac{n}{N}\right) \\ \cos\left(2 \cdot \pi \cdot \frac{n}{N}\right) \\ \ldots \\ \ldots \\ \cos\left((2 \cdot N - 2) \cdot \pi \cdot \frac{n}{N}\right) \\ \cos\left((2 \cdot N - 1) \cdot \pi \cdot \frac{n}{N}\right) \end{bmatrix}$$

$$SIN_n[\ ] = \begin{bmatrix} 0 \\ \sin\left(\pi \cdot \frac{n}{N}\right) \\ \sin\left(2 \cdot \pi \cdot \frac{n}{N}\right) \\ \ldots \\ \ldots \\ \sin\left((2 \cdot N - 2) \cdot \pi \cdot \frac{n}{N}\right) \\ \sin\left((2 \cdot N - 1) \cdot \pi \cdot \frac{n}{N}\right) \end{bmatrix}$$

The computer 308 receives the succession of constellation symbols Xn of the OFDM block and simultaneously computes the sequence of the 2.N samples (N=FFT Size and L=2) of each component Pn and Qn according to the equations $$\sum_{n=0}^{N-1} P_{n,l} = \text{Re}\left[x\left(l \cdot \frac{Te}{L}\right)\right] \text{ and } \sum_{n=0}^{N-1} Q_{n,l} = \text{Im}\left[x\left(l \cdot \frac{Te}{L}\right)\right].$$

These operations are therefore performed between the representation in a complex plane of the constellation of the constellation symbol $Xn = An + j \cdot Bn$ and the generation of the time samples of the cosine and sine components of the carrier indexed n by the module 302. At output of the computer 308, the following two components are obtained:

$$AP_n[\ ] = \begin{bmatrix} A_n \\ P_{n,1} \\ \ldots \\ \ldots \\ P_{n,2 \cdot N-2} \\ P_{n,2 \cdot N-1} \end{bmatrix} \quad AQ_n[\ ] = \begin{bmatrix} B_n \\ Q_{n,1} \\ \ldots \\ \ldots \\ Q_{n,2 \cdot N-2} \\ Q_{n,2 \cdot N-1} \end{bmatrix}$$

At each clock stroke, expressing the rate of processing from one carrier to another, 2.N results are loaded into the memorizing entity 307. At the same time, the complex samples of the cosine and sine components given by the entity 302 for generating a multi-carrier signal, which had previously been indexed n−1, are replaced by the complex samples associated with the carrier indexed n.

At the end of the OFDM block indexed m constituted by N carriers, when n=N−1, the set of pre-built real-time samples of S(l.Te/2) on the duration of an OFDM symbol, with the exception of a last value that is overlooked, are contained in the vector $S_{N-1}[\ ]$ at the output of the memorizing entity 307 and a validation signal V is activated during a clock cycle.

The vector $S_{N-1}[\ ]$ comprises two distinct vector parts: at initialization the accumulators of the memorizing entity 307 are set at zero, and we have: $BP_0[\ ] = [0] BQ_0[\ ] = [0]$, and, at the $n^{th}$ order, for $0 < n < N : BP_n[\ ] = \Sigma_{i=0}^{n-1} AP_i[\ ]$, $BQ_n[\ ] = \Sigma_{i=0}^{n-1} AQ_i[\ ]$ The activation of this signal V then has the effect of transferring the 2.N time samples from the memorizing entity 307 to the updating entity 305.

The updating entity 305 is therefore reinitialized at this instant by the closing of a switch SW2 commanded by the signal V in order to connect the output of the memorizing entity 307 to the input of the updating entity 305 and simultaneously by the opening of a switch SW1 commanded by the complementary signal W. This is done in such a way as to erase the process of accumulation in the preceding updating entity 305 in interrupting the return of the updating entity 305 to its input.

Then, the switches SW1 and SW2 are again switched over for the remainder of the OFDM block in the closed and open positions respectively, and the updating entity 305 then works in "accumulation alone" mode from the real-time samples given by the computation entity 306 enabling the building of the M complex samples associated with the complex correction data obtained according to the invention.

The memorizing entity is then integrally reset by a signal R synchronous with this loading signal V. The pre-building computations and the memorizing operations then start again on an OFDM block indexed m+1.

In parallel, the sequence of constellation symbols Xn of the block indexed m have traveled through a delay line 309 of a duration N. Thus, the first symbol $X_0$ of the block indexed m emerges when the updating entity 305 has just been reinitialized by the memorizing entity 307.

Starting with this first symbol $X_0$ of the OFDM block indexed m, the correction weighting entity 301 then receives, successively and at the clock rate, the original constellation values broken down into two components An and Bn of a constellation symbol Xn modulating a carrier indexed n, and renders optimized shifts (dAn, dBn) for each of the two components, the real and imaginary components, which will have the effect of modifying the constellation of the current symbol Xn.

The method according to the invention therefore optimizes a pair of complex shift solutions (dAn, dBn) and by addition with the original components An and Bn, a new pair (A'n, B'n) is obtained. This new pair, applied at input of the transformation from the frequency domain to the time domain, for example by an IFFT and after modulation 106 with reference to FIG. 1A, will enable the generation of a signal S'(t) that has a reduced PAPR level.

The computation entity 306 determines a set of L.N real, pre-built time samples representing the complex shift (dAn, dBn) performed for each constellation symbol while at the same time receiving the M=L.N=2N complex time samples of the carrier modulated by this symbol given by the generator 302.

Thus, 4N time samples are delivered by the generator 302 identically and synchronously to the two computation entities 308 and 306 respectively feeding the memorizing entity 307 and the updating entity 305. Indeed, the time lag between the operations that bring into the same components into action corresponds exactly to the period of an OFDM block.

The method according to the invention therefore optimizes a pair of complex shift solutions (dAn, dBn) and by addition with the original components An and Bn, a new pair (A'n, B'n) is obtained. This new pair, applied at input of a transformation from the frequency domain to the time domain, for example by an inverse fast Fourier transform (IFFT) and after modulation 106 with reference to FIG. 1A, will generate a signal S'(t) which has a reduced PAPR level.

At output from the computation entity 306, we thus obtain two signal vectors: CdPn[ ] and CdQn[ ], of which the real and imaginary components and $dP_{n,l}$ and $dQ_{n,l}$ respectively have the following expressions:

$$dP_{n,l} = \left[dA_n \cos\left(\pi \cdot l \cdot \frac{n}{N}\right) - dB_n \sin\left(\pi \cdot l \cdot \frac{n}{N}\right)\right],$$

$$dQ_{n,l} = \left[dB_n \cos\left(\pi \cdot l \cdot \frac{n}{N}\right) + dA_n \sin\left(\pi \cdot l \cdot \frac{n}{N}\right)\right].$$

Then, at each clock stroke and starting from the signal vector $S_{N-1}[\ ]$ loaded at initialization in the updating entity 305, all the real and imaginary samples of the signal S'(l.Te/2) are re-updated gradually by the accumulating, in the updating entity 305, of the current results of the above equations obtained at output of the computation entity 306.

At each clock stroke, a pair of results is therefore accumulated in the updating entity 305 and the samples of the carrier at output of the generator 302, which were previously of the n−1 order, then switch to those of the next carrier indexed n which will be represented by a constellation symbol corrected by the new shift pair (dAn, dBn).

Since the updating entity 305 is registered in the same way as the memorizing entity 307, we obtain two signal vectors at output of the updating entity 305 which have the expression:

for n=0, the accumulators of the block D are initialized by the block B and:

$DP_0[\ ] = \Sigma_{i=0}^{N-2} BP_i[\ ], DQ_0[\ ] = \Sigma_{i=0}^{N-2} BQ_i[\ ]$, at the nth order for 0<n<N:

$DP_n[\ ] = \Sigma_{i=0}^{N-2} BP_i[\ ] = \Sigma_{j=0}^{n-1} CdP_j[\ ]$ and
$DQ_n[\ ] = \Sigma_{i=0}^{N-2} BQ_i[\ ] + \Sigma_{j=0}^{n-1} CdQ_j[\ ]$ From the output of the updating entity 305, a detection entity 304 then identifies the P power peaks above a determined threshold value $\alpha$, in setting all the M−P signal values ranging from −$\alpha$ to +$\alpha$ at zero and keeping only the peak values. This threshold value $\alpha$ sets the final PAPR level sought.

At output of the detection entity 304, two signal vectors are then obtained. These signal vectors are defined as follows: EPn[ ]=Discr(DPn[ ]) EQn[ ]=Discr(DQn[ ]) with:

$$Discr(DP_{n,l}[\ ]) = \begin{vmatrix} DP_{n,l} & si & [(DP_{n,l})^2 + (DQ_{n,l})^2] \geq \alpha^2 \\ 0 & & \text{otherwise} \end{vmatrix} et$$

$$Discr(DQ_{n,l}[\ ]) = \begin{vmatrix} DQ_{n,l} & si & [(DP_{n,l})^2 + (DQ_{n,l})^2] \geq \alpha^2 \\ 0 & & \text{otherwise} \end{vmatrix}$$

an example of vectors for which the samples 0, 3, . . . , (2.N−4), and (2.N−2) constitute signal peaks of amplitude greater than $\alpha$ obtained at output of the detection entity 304 is given here below:

$$EP_n[\ ] = \begin{bmatrix} DP_{n,0} \\ 0 \\ 0 \\ DP_{n,3} \\ \cdots \\ \cdots \\ DP_{n,2 \cdot N-4} \\ 0 \\ DP_{n,2 \cdot N-2} \\ 0 \end{bmatrix} \quad EQ_n[\ ] = \begin{bmatrix} DQ_{n,0} \\ 0 \\ 0 \\ DQ_{n,3} \\ \cdots \\ \cdots \\ DQ_{n,2 \cdot N-4} \\ 0 \\ DQ_{n,2 \cdot N-2} \\ 0 \end{bmatrix}$$

The detection entity 304 then gives the information to a correlation entity using a correlator 303 which will take a product of complex correlation between the sine and cosine samples of the nth order sub-carrier provided by the generator and the real and imaginary components respectively $EP_n[\ ]$ and $EQ_n[\ ]$, at output from the detection entity 304 for detecting P samples.

If $G_n[\ ] = COS_n[\ ] + j.SIN_n[\ ]$, and $E_n[\ ] = EP_n[\ ] + j.EQ_n[\ ]$, the product of correlation performed has the result: $F_n = C_{EG\ n}(0) = \Sigma_{l=0}^{2.N-1} E_n(l).G_n^*(l)$ with: $G_n^*$ the conjugate of $G_n$ et $Re(F_n) = \Sigma_{l=0}^{2.N-1}[EP_{n,l}.COS_{n,l} + EQ_{n,l}.SIN_{n,l}]$ and $Im(F_n) = \Sigma_{l=0}^{2.N-1}[EQ_{n,l}.COS_{n,l} - EP_{n,l}.SIN_{n,l}]$ The result of this operation will make it possible to prepare a correction by shifting dn=dAn+j.dBn of the constellation symbols Xn, which will make the re-updating of the signal progress towards the overall diminishing of the signal peaks.

Thus, when the polarity of the real (imaginary) part of the correlation product Fn, called a piece of complex correlation data, is positive, then a correction by negative shift dAn (dBn) of the constellation symbol must be chosen. Conversely, if the polarity is the opposite, a correction by positive shift dAn (dBn) must be selected to obtain A'n (B'n), the new coordinates of the constellation symbol X'n with: A'n=An+dAn and B'n=Bn+dBn.

As with the prior-art TI-CES, CD, ACE and TR techniques, the method according to the invention leads to a modification of the constellation for modulating the carriers in the frequency domain before IFFT, to then obtain a signal with reduced PAPR in the time domain.

The advantage of the method according to the invention is the flexibility of correction of constellations. Indeed any type of correction can be applied according to the invention, provided that it can be expressed by a controlled, complex shift of the real and/or imaginary components of the constellation symbol associated with a carrier.

Thus, the complex shifts in the positive sense or negative sense along the x-axis and the y-axis of the complex plane can lead to keeping the constellation points in their decision sector or in the original constellation or else shift them outside.

Referring to FIG. 7, the method according to the invention enables the application of the complex shifts both inside (71) and outside (72) the original constellation.

Consequently, the implementing of the method according to the invention delivers two novel, more general constellation correction classes:

the ICS (Inside Constellation Shift) class 71 for which, when the applied modification remains moderate, the shifted constellation points are still inscribed within the original constellation, this class partly including especially the prior-art CD technique described earlier, and the OCS (Outside Constellation Shift class 72 for which the points are shifted outside the original constellation, this class including the prior-art TI-CES and ACE techniques described earlier.

In the TR technique (of the prior art described earlier), there is no notion of constellation, the constellation of the peak-reducing pilot carriers (PRT) being defined solely with the aim of reducing the PAPR. This can also be controlled by the method according to the invention.

The constellation correction implemented according to the invention can therefore replace any constellation correction whatsoever of the prior-art PAPR reducing techniques described earlier by choosing, whether or not, to adopt all the advantages of each of these techniques taken separately.

One advantage of the proposed system then is to be able to gain in efficiency by enabling the association of several techniques, the distinct respective faults of which can, to a certain extent, compensate for each other.

Thus the method according to the invention makes it possible to obtain two novel types of constellation called <<ICS>> or <<OCS>> depending on whether the constellation points are shifted respectively towards the interior or towards the exterior of the original constellation. Each of these novel types combines different prior-art techniques.

According to an advantageous variant of the invention, the amplitude of the shifts that are imposed is advantageously proportional to the result of the correlation product $F_n$.

Thus $d_n = -\beta \cdot F_n$, with $\beta$ being a factor of proportionality such that $0 < \beta < 1$. The expression $Cd_n[\ ] = CdP_n[\ ] + j \cdot CdQ_n[\ ]$ of the output signal from the computation unit 306 becomes: $Cd_n[\ ] = d_n \cdot G_n = -\beta \cdot F_n \cdot G_n$. In considering, for $l = p_0$, a particular complex sample constituting a signal peak above the predetermined threshold $\alpha$ isolated by the detection entity 304, we then obtain: $Cd_n(p_0) = -\beta \cdot E_n(p_0) \cdot G_n^*(p_0) \cdot G_n(p_0) = -\beta \cdot D_n(p_0)$ And, at the n+1 order (for $n \leq N-2$), the pre-built sample of the maximum amplitude peak in $p_0$ becomes:
$D_{n+1}(p_0) = \Sigma_{i=0}^{N-2} B_i(p_0) + \Sigma_{j=0}^{n-1} Cd_j(p_0) - \beta \cdot D_n(p_0) = (1-\beta) \cdot D_n(p_0)$. And finally, from this we deduce the nth order expression:

$$D_n(p_0) = (1-\beta)^n \cdot [\Sigma_{i=0}^{N-2} B_i(p_0)].$$

Since the term $(1-\beta)^n$ only decreases as and when the algorithm moves forward in the OFDM block, the above equation shows that, from the initial temporal response of the signal $x(l \cdot T_e / 2)$ comprising an isolated peak in the sample $p_0$, the algorithm will therefore reduce the amplitude of this peak at each new symbol Xn in applying a correction by a shift dn, until it has an amplitude below $\alpha$.

This operation is applied simultaneously to all the P peaks detected. Thus, in the presence of several peaks, since the operation is linear, the operation will tend to reduce all these peaks. Nonetheless, certain samples could necessitate shifts dAn (dBn) in senses opposite the shifts necessary to reduce certain other samples.

The advantage of the principle of correction by correlation product implemented by the correlator 303, is that it makes it possible to provide correction information weighted according to the levels and phases of the different peaks relative to each other.

This technique therefore removes the need to impose a threshold of efficiency for taking or not taking account of a shift operation.

It must be noted that, at the start of the correction of the OFDM block, the dynamic range of the correlation signal will be very high as compared with the dynamic range at the end of the block where the peaks remaining to be corrected are few and the amplitude with which they exceed the threshold $\alpha$ is low.

In this case, the correction deviations will be very great at the beginning, with possibly a very high error rate as compared with the CD technique and become almost zero at the end of processing.

In order to homogenize the amplitudes of correction on the duration of a block with the consequence especially of very significantly reducing, the error rate as compared with the CD technique, and the peak amplitudes of the constellation deviations which could lead to saturation, one particular aspect of the invention implements a weighting, by the correction and correlation entity (303), of the correlation signal outputted by the correlator 303 according to the progress of the algorithm in the OFDM block in defining U as:

$$\beta = \left(\beta_0 \cdot \frac{U_1 + n}{U_1 + N}\right)^\delta$$

for example where $\beta_0$, $\beta_1$, $\delta$ are positive constants and $\delta = 2$ for example.

According to another particular aspect of the invention, as an alternative to the above weighting, a normalisation of the real and imaginary parts of the correlation product is implemented according to the expressions:

$$\Re e(F_n) = U_0 \cdot \frac{\sum_{l=0}^{2 \cdot N-1} (EP_{n,l} \cdot COS_{n,l} + EQ_{n,l} \cdot SIN_{n,l})}{\sum_{l=0}^{2 \cdot N-1} |EP_{n,l} \cdot COS_{n,l} + EQ_{n,l} \cdot SIN_{n,l}|} \text{ and}$$

$$\Im m(F_n) = \beta_0 \cdot \frac{\sum_{l=0}^{2 \cdot N-1} (EQ_{n,l} \cdot COS_{n,l} - EP_{n,l} \cdot SIN_{n,l})}{\sum_{l=0}^{2 \cdot N-1} |EQ_{n,l} \cdot COS_{n,l} - EP_{n,l} \cdot SIN_{n,l}|}$$

where $\beta_0$ is a positive constant dependent for example:

inversely proportionally to the size of a transformation from the frequency domain to the time domain, for example an inverse fast Fourier transform (IFFT), on the value of the predetermined threshold $\alpha$, on the efficiency of the type of correction used, One example of an equation of this constant $\beta_0$ is for example:

$$\beta_0 = \frac{(PAPR - \alpha)^\gamma}{\beta_{Correction}} \cdot \frac{1}{N}$$

with $\gamma = 2$ for example.

In another alternative to the normalisation and to the weighting described here above to homogenize the amplitudes of correction on the duration of a block, the predetermined threshold $\alpha$ is made to vary according to the progress of the algorithm in the OFDM block.

One expression of the predetermined threshold $\alpha$ has for example the following form:

$$\alpha = \alpha_0 \cdot \left[1 + \beta_2 \cdot \left(\frac{N-n}{N}\right)^\delta\right]$$

where $U_2$ is a positive constant, $\delta=3$ for example and $\alpha_0$ corresponds to the ratio between the value of maximum amplitude of power desired and the average power of the signal.

Thus, the results of the real and imaginary parts of the correlation product determine the complex shifts of the constellation symbols in order to obtain a reduced PAPR. These shifts are therefore adapted to the result of the complex correlation product of each carrier. We therefore have a shift whose amplitude can vary from one symbol to another.

According to an advantageous aspect of the invention, an additional weighting entity 301 is implemented independently of a possible weighting implemented by the correction and correlation entity 303.

The additional weighting entity 301 weights the correction values according to the location of the constellation symbol. Thus, in the case of shifts of constellation symbols corresponding to the ACE technique or to several combined types constellation correction corresponding to the CD and ACE techniques for example, the symbols are not all modified in the same way.

In the second case for example, small shifts are permitted for the symbols inside the constellation, and greater shifts are permitted towards the exterior, for the symbols situated on the periphery of the constellation.

This weighting is also necessary in the case of several different constellations being used in a same OFDM block. This makes the system completely compatible with the technique for adapting the size of the constellation known as "bit-loading".

Figure 5:
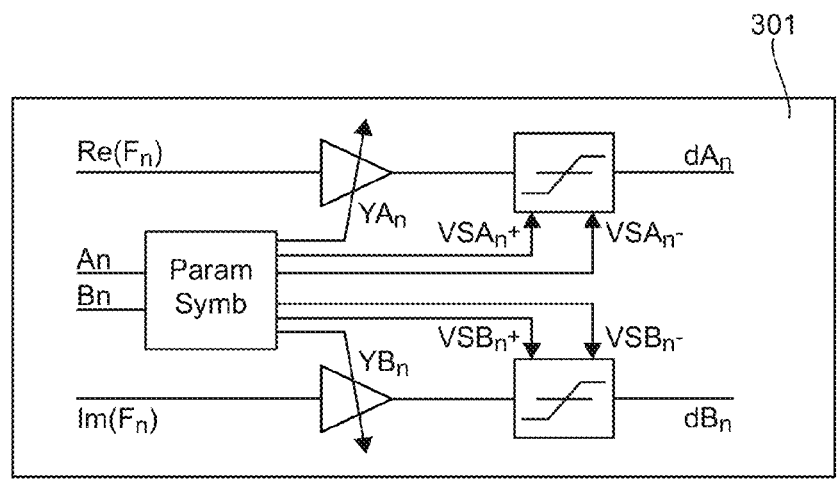
FIG. 5 illustrates the principle of operation of the means for weighting the real part, the imaginary part respectively, of a complex shift applied to the constellation symbol modulating a carrier.

The principle of operation of the additional weighting entity 301 is illustrated in FIG. 5.

The additional weighting entity 301 inputs the real and imaginary parts of the correlation product and applies gain $YA_n$ and $YB_n$ respectively to each of them. This is then followed by a saturation of the positive and negative values, distinctly, according to the threshold values respectively $VSA_{n+}$, $VSA_{n-}$ and $VSB_{n+}$, $VSB_{n-}$.

From an input signal $he_n$, the saturation function of the real (imaginary) part renders a signal $hs_n$, which verifies the following conditions:

$$hs_n = \begin{vmatrix} VSA_n+ & si & he_n > VSA_n+ \\ VSA_n- & si & he_n < VSA_n- \\ he_n & & \text{otherwise} \end{vmatrix}$$

A «symbol parameters» module (not shown) then identifies the current symbol Xn in the constellation and, depending on its position, determines all the gain and saturation threshold values to be applied to the real and imaginary components of the correlation result in order to determine the shift values dAn and dBn compliant with the type of correction sought.

For example, we consider an OFDM signal, of which the constellation symbols Xn form a constellation QAM64, as represented in FIG. 8A. We then have Xn=An+j.Bn with:

$$An, Bn \in \left\{\pm\frac{1}{4}, \pm\frac{3}{4}, \pm\frac{5}{4}, \pm\frac{7}{4}\right\}.$$

The different gains and saturation threshold values, in the processing branches of the real and imaginary parts of the module H can then be defined as follows:

$$YA_n = \begin{vmatrix} 1/2 & \text{if} & |A_n| = 7/4 \\ 1/32 & & \text{otherwise} \end{vmatrix} \quad YB_n = \begin{vmatrix} 1/2 & \text{if} & |B_n| = 7/4 \\ 1/32 & & \text{otherwise} \end{vmatrix}$$

$$VSA_n\, += \begin{vmatrix} 11/4 & \text{if} & A_n = +7/4 \\ 1/8 & \text{if} & A_n = -7/4 \\ 1/32 & & \text{otherwise} \end{vmatrix} \quad VSB_n\, += \begin{vmatrix} 11/4 & \text{if} & B_n = +7/4 \\ 1/8 & \text{if} & B_n = -7/4 \\ 1/32 & & \text{otherwise} \end{vmatrix}$$

$$VSA_n\, -= \begin{vmatrix} -11/4 & si & A_n = -7/4 \\ -1/8 & si & A_n = +7/4 \\ -1/32 & & \text{otherwise} \end{vmatrix} \quad VSB_n\, -= \begin{vmatrix} -11/4 & si & B_n = -7/4 \\ -1/8 & si & B_n = +7/4 \\ -1/32 & & \text{otherwise} \end{vmatrix}$$

With these values, the corrected constellation of FIG. 8B is then obtained. Thus, according to the invention, despite the relatively big modifications imposed in order to reduce the PAPR, the ACE deviations (peripheral points) fully compensate for the deterioration of the BER given by CD (internal points).

FIGS. 8C and 8D similarly illustrate a comparison between an original constellation and a constellation corrected according to the invention for a QAM16 type modulation.

Description of the Transmission Device According to the Invention

Figure 6:
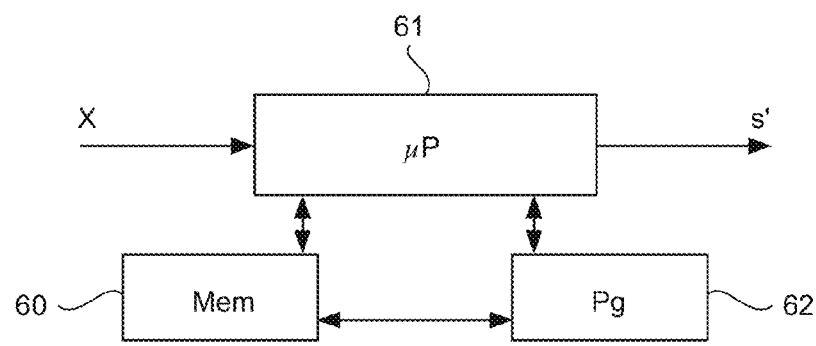
FIG. 6 illustrates the structure of a transmission device according to the invention.

Finally, referring to FIG. 6, we present the simplified structure of a device for transmitting a multi-carrier signal representing a source signal comprising blocks each constituted by N carriers, called OFDM blocks, each carrier being modulated by a constellation symbol and being identified by an index n, n being an integer such that $0 \le n \le N-1$.

Such a transmission device comprises a memorizing module 60 comprising a buffer memory Mem, a processing unit 61 equipped for example with a microprocessor μP and driven by a computer program 62 implementing the method for transmitting according to the invention.

At initialization, the code instructions of the computer program 62 are loaded for example into a RAM and then executed by the processor of the processing unit 61. The processing unit 61 input a multi-carrier signal x. The microprocessor of the processing unit 61 implements the steps of the method for transmitting described here above according to the instructions of the computer program 62, to carry out a correction of the modulation constellation aimed at reducing the PAPR of the signal x.

To this end the device for transmitting comprises, in addition to the buffer memory Mem, a pre-processing unit implemented in the frequency domain comprising: a module for pre-building (307) complex time samples delivering M pre-built complex time samples representing N carriers of said OFDM block, M being an integer, and a correction module for correcting constellation symbols that modulate the carriers of said OFDM block, said module for correcting comprising the following entities repeated for each carrier: an entity for detecting 304 P samples, P being an integer, among said M pre-built complex time samples coming from said pre-building phase when n=0, or among M updated pre-built complex time samples coming from an updating entity implemented for a preceding carrier when $0<n \le N-1$, having power above a predetermined threshold (α), said entity for detecting delivering said P samples and M−P zero samples constituting M complex time samples to be corrected, an entity for correcting 303 the constellation symbol modulating said carrier as a function of said M complex time samples to be corrected, delivering a piece of complex correction data (Fn) for correcting said constellation symbol, said entity for correcting implementing an operation of complex correlation of the M complex temporal samples to be corrected with M complex temporal samples associated with the current carrier, an entity for building 306 M complex time samples associated with said complex correction data, an entity for updating 305 said M pre-built complex time samples, said entity for updating implementing an accumulator associating, in sets of two, said M complex time samples associated with said piece of complex correction data with said M pre-built complex time samples coming from said pre-building module when n=0, or with said M complex time samples coming from an entity for updating implemented for a preceding carrier when 0<n≤N−1, delivering M complex time samples used for the following carrier, a modulator implementing a transformation, from the frequency domain to the time domain, of a signal coming from said pre-processing unit and a unit for the transmission and/or storage of a signal coming from said modulator.

These means are driven by the microprocessor of the processing unit 61.

Although the present disclosure has been described with reference to one or more examples, workers skilled in the art will recognize that changes may be made in form and detail without departing from the scope of the disclosure and/or the appended claims.

The invention claimed is:

1. A method for transmitting a multi-carrier signal representing a source signal comprising blocks each constituted by N carriers, called OFDM blocks, each carrier being modulated by a constellation symbol and being identified by an index n, n being an integer such that 0≤n≤N−1, wherein the method comprises the following acts for at least one of the OFDM blocks:
   an act of pre-processing implemented in the frequency domain comprising:
      a phase of pre-building complex time samples delivering M pre-built complex time samples representing the N carriers of said OFDM block, M being an integer, and
      a phase of correcting constellation symbols that modulate the carriers of said OFDM block, said phase of correcting delivering a corrected OFDM block and comprising the following acts, repeated for each carrier of the OFDM block:
         detecting P samples, P being an integer, from among said M pre-built complex time samples coming from said phase of pre-building when n=0, or from among M updated pre-built complex time samples coming from an act of updating implemented for a previous carrier when 0<n≤N−1, having power above a predetermined threshold, said act of detecting delivering the P samples and M−P zero samples, constituting M complex time samples to be corrected,
         correcting the constellation symbol modulating said carrier according to said M complex time samples to be corrected, delivering a piece of complex correction data for correcting said constellation symbol,
         building M complex time samples associated with said piece of complex correction data,
         updating said M pre-built complex time samples, said updating implementing an accumulation associating, in sets of two, said M complex time samples associated with said piece of complex correction data, with said M pre-built complex time samples coming from said pre-building phase when n=0 or with said M updated pre-built complex time samples coming from the act of updating implemented for the previous carrier when 0<n≤N−1,
      an act of modulation implementing a transformation, from the frequency domain to the time domain, of a signal comprising at least said corrected OFDM block, coming from said phase of correcting from said pre-processing act, delivering a signal with reduced peak-to-average-power ratio (PAPR) in the time domain relative to the multi-carrier signal;
      an act of performing at least one of transmission or storage of the signal with reduced PAPR.

2. The method for transmitting according to claim 1, wherein said piece of complex correction data results from the complex correlation of said M complex time samples to be corrected with M complex time samples associated with said carrier indexed n.

3. The method for transmitting according to claim 1, wherein said phase of pre-building complex time samples implements a step of oversampling such that M=N.L, L being an integer factor of oversampling.

4. The method for transmitting according to claim 1, wherein said pre-building phase comprises the following acts repeated for each carrier indexed n:
   building M complex time samples associated with said carrier,
   memorizing of M complex time samples associated with said carrier and the carriers previously pre-processed in the pre-building phase, by accumulation associating, in sets of two, said M complex time samples associated with said carrier with M complex time samples associated with the carriers previously processed in the pre-building phase,
   delivering said M pre-built complex time samples.

5. The method for transmitting according to claim 1, wherein said act of correcting the constellation symbol implements a summation of the coordinates of said constellation symbol, called original coordinates of said constellation symbol, with coordinates representing a complex shift of said constellation symbol on the x axis and y axis of the complex plane of the constellation of said constellation symbol, said complex shift being selected by using said piece of complex correction data from among the complex shifts belonging to at least one of the following categories:
   negative real shift, imaginary shift respectively, of said complex shift, when the signs of the real part and the imaginary part of said piece of complex correction data are identical;
   positive real shift, imaginary shift respectively, of the complex shift when the signs of the real part and the imaginary part of said piece of complex correction data are opposite.

6. The method for transmitting according to claim 5, wherein the absolute value of the real part, imaginary part respectively, of said complex shift is proportional to the real part, imaginary part respectively, of said piece of complex correction data.

7. The method for transmitting according to claim 5, wherein said act of correcting the constellation symbol also implements a weighting of the real part, imaginary part respectively, of said complex shift according to said original coordinates of said constellation symbol.

8. The method for transmitting according to claim 1, wherein it further comprises an act of weighting said complex correction data by a weighting factor.

9. The method for transmitting according to claim 8, wherein said weighting factor varies from one carrier to another according to the value of said index n of said carrier.

10. The method for transmitting according to claim 1, wherein it further comprises an act of normalisation of said piece of complex correction data.

11. The method for transmitting according to claim 1, wherein said predetermined threshold varies from one carrier to another according to the value of said index n of said carrier.

12. The method for transmitting according to claim 1, wherein it further comprises a switching act enabling the transfer of said M pre-built complex time samples coming from said pre-building phase to the input of said detecting from said correction phase.

13. A device for transmitting a multi-carrier signal representing a source signal comprising blocks each constituted by N carriers, called OFDM blocks, each carrier being modulated by a constellation symbol and being identified by an index n, n being an integer such that $0 \leq n \leq N-1$, wherein said device for transmitting comprises, for at least one of the OFDM blocks:
  a pre-processing unit implemented in the frequency domain comprising:
    a pre-building module configured to pre-build complex time samples delivering M pre-built complex time samples representing the N carriers of said OFDM block, M being an integer, and
    a correction module configured to correct constellation symbols that modulate the carriers of said OFDM block, said correction module delivering a corrected OFDM block and comprising the following entities repeated for each carrier of the OFDM block:
      a detecting entity configured to detect P samples, P being an integer, among said M pre-built complex time samples coming from said pre-building module when n=0, or among M updated pre-built complex time samples coming from an updating entity implemented for a preceding carrier when $0 < n \leq N-1$, having power above a predetermined threshold, said entity for detecting delivering said P samples and M−P zero samples constituting M complex time samples to be corrected,
      a correcting entity configured to correct the constellation symbol modulating said carrier as a function of said M complex time samples to be corrected, delivering a piece of complex correction data for correcting said constellation symbol,
      a building entity configured to build M complex time samples associated with said piece of complex correction data,
      an updating entity configured to update said M pre-built complex time samples, said updating entity implementing an accumulator associating, in sets of two, said M complex time samples associated with said piece of complex correction data with said M pre-built complex time samples coming from said pre-building module when n=0, or with said M updated pre-built complex time samples coming from the updating entity implemented for the preceding carrier when $0 < n \leq N-1$,
    a modulator implementing a transformation, from the frequency domain to the time domain, of a signal comprising at least said corrected OFDM block coming from said correction module from said pre-processing unit, delivering a signal with reduced peak-to-average-power ratio (PAPR) in the time domain relative to the multi-carrier signal;
  a unit configured to perform at least one of transmit or store the signal with reduced PAPR.

14. The device for transmitting according to claim 13, wherein said correcting entity comprises:
  means for summating the coordinates of said constellation symbol, called original coordinates of said constellation symbol, with coordinates representing a complex shift of said constellation symbol on the x and y axes of the complex plane of the constellation of said constellation symbol, and
  means for weighting the real part and imaginary part respectively of said complex shift according to said original coordinates of said constellation symbol.

15. A non-transitory computer-readable memory storing a computer program thereon, which comprises instructions for implementing a method for transmitting a multi-carrier signal representing a source signal comprising blocks each constituted by N carriers, called OFDM blocks, each carrier being modulated by a constellation symbol and being identified by an index n, n being an integer such that $0 \leq n \leq N-1$, when this program is executed by a processor, wherein the method comprises the following acts for at least one of the OFDM blocks:
  an act of pre-processing implemented in the frequency domain comprising:
    a phase of pre-building complex time samples delivering M pre-built complex time samples representing the N carriers of said OFDM block, M being an integer, and
    a phase of correcting constellation symbols that modulate the carriers of said OFDM block, said phase of correcting delivering a corrected OFDM block and comprising the following acts, repeated for each carrier of the OFDM block:
      detecting P samples, P being an integer, from among said M pre-built complex time samples coming from said phase of pre-building when n=0, or from among M updated pre-built complex time samples coming from an act of updating implemented for a previous carrier when $0 < n \leq N-1$, having power above a predetermined threshold, said act of detecting delivering the P samples and M−P zero samples, constituting M complex time samples to be corrected,
      correcting the constellation symbol modulating said carrier according to said M complex time samples to be corrected, delivering a piece of complex correction data for correcting said constellation symbol,
      building M complex time samples associated with said piece of complex correction data,
      updating said M pre-built complex time samples, said updating implementing an accumulation associating, in sets of two, said M complex time samples associated with said piece of complex correction data, with said M pre-built complex time samples coming from said pre-building phase when n=0 or with said M updated pre-built complex time samples coming from the act of updating implemented for the previous carrier when $0 < n \leq N-1$,
  an act of modulation implementing a transformation, from the frequency domain to the time domain, of a signal comprising at least said corrected OFDM block, coming from said phase of correcting from said pre-processing act, delivering a signal with reduced peak-toaverage-power ratio (PAPR) in the time domain relative to the multi-carrier signal;

an act of performing at least one of transmission or storage of the signal with reduced PAPR.

* * * * *